(12) United States Patent
Jung et al.

(10) Patent No.: US 12,177,123 B1
(45) Date of Patent: Dec. 24, 2024

(54) ROUTING INGRESS TRAFFIC FOR LOGICALLY ISOLATED NETWORKS DESTINED FOR IP BLOCKS WITHOUT ANY NETWORK ADDRESS TRANSLATION

(71) Applicant: Amazon Technologies, Inc., Seattle, WA (US)

(72) Inventors: Young Ha Jung, Frisco, TX (US); Upendra Bhalchandra Shevade, Washington, DC (US); Mathew Lehwess, San Francisco, CA (US); Matthew B Barr, Arlington, VA (US); Akshay Choudhry, Bellevue, WA (US); Shuai Ye, Herndon, VA (US); Ethan Joseph Torretta, Edmonds, WA (US); Kirk Arlo Petersen, Nevada City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 17/810,290

(22) Filed: Jun. 30, 2022

(51) Int. Cl.
*H04L 45/745* (2022.01)

(52) U.S. Cl.
CPC ................. *H04L 45/745* (2013.01)

(58) Field of Classification Search
CPC .................................................. H04L 45/745
See application file for complete search history.

(56) References Cited

U.S. PATENT DOCUMENTS

| | | | |
|---|---|---|---|
| 8,369,333 B2 | 2/2013 | Hao et al. | |
| 9,014,191 B1 | 4/2015 | Mandal et al. | |
| 9,124,536 B2 | 9/2015 | DeCusatis et al. | |
| 9,906,401 B1 | 2/2018 | Rao | |
| 10,833,992 B1 | 11/2020 | Dickinson | |
| 11,671,365 B2 * | 6/2023 | Dickinson | H04L 45/586 370/392 |
| 2016/0087940 A1 | 3/2016 | Miller et al. | |
| 2020/0169534 A1 | 5/2020 | Fritz et al. | |
| 2020/0236046 A1 * | 7/2020 | Jain | H04L 49/70 |
| 2021/0135991 A1 | 5/2021 | Dickinson | |
| 2022/0210113 A1 * | 6/2022 | Pillareddy | H04L 61/103 |

(Continued)

OTHER PUBLICATIONS

Zhangwei He, et al, "Improve Reliability of Scalable VPN Routing Via Relaying," Proceedings of IC-NIDC2010, 2010, pp. 1-6.

*Primary Examiner* — Abdullahi Ahmed
(74) *Attorney, Agent, or Firm* — S. Scott Foster; Kowert, Hood, Munyon, Rankin & Goetzel, P.C.

(57) ABSTRACT

Route tables may be associated with ingress traffic for logically isolated networks. A routing device at the edge of a logically isolated network may receive a route to include in a route table that is associated with ingress traffic to the logically isolated network, where the ingress traffic is destined for a block of public or private IP addresses. The route instructs the edge routing device to forward such ingress traffic to a network interface of a network appliance hosted in the logically isolated network. Network packets received at the edge routing device may have a destination of one or more public or private IP addresses in the block of public/private IP addresses. The edge routing device may identify the route in the route table that forwards the ingress network traffic destined for the block of public or private IP addresses to the network interface for the network appliance.

20 Claims, 14 Drawing Sheets

(56) References Cited

U.S. PATENT DOCUMENTS

| 2022/0278927 A1* | 9/2022 | Mariappan | H04L 45/745 |
| 2022/0311735 A1* | 9/2022 | Sayko | H04L 61/2517 |
| 2023/0079209 A1* | 3/2023 | Nallamothu | H04L 45/745 |
| | | | 709/238 |

* cited by examiner

ROUTING INGRESS TRAFFIC FOR LOGICALLY ISOLATED NETWORKS DESTINED FOR IP BLOCKS WITHOUT ANY NETWORK ADDRESS TRANSLATION

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers may wish to take advantage of specifying how network traffic is to be handled within provider networks using logically isolated networks within the provider network. Logically isolated networks may provide a customizable virtual networking environment for virtual computing resources hosted within a logically isolated network, allowing for optimized traffic routing, security, or connections to be established to use the virtual computing resources in the provider network. Thus, techniques that further extend the use of some or all of a logically isolated network are highly desirable.

Figure 1:
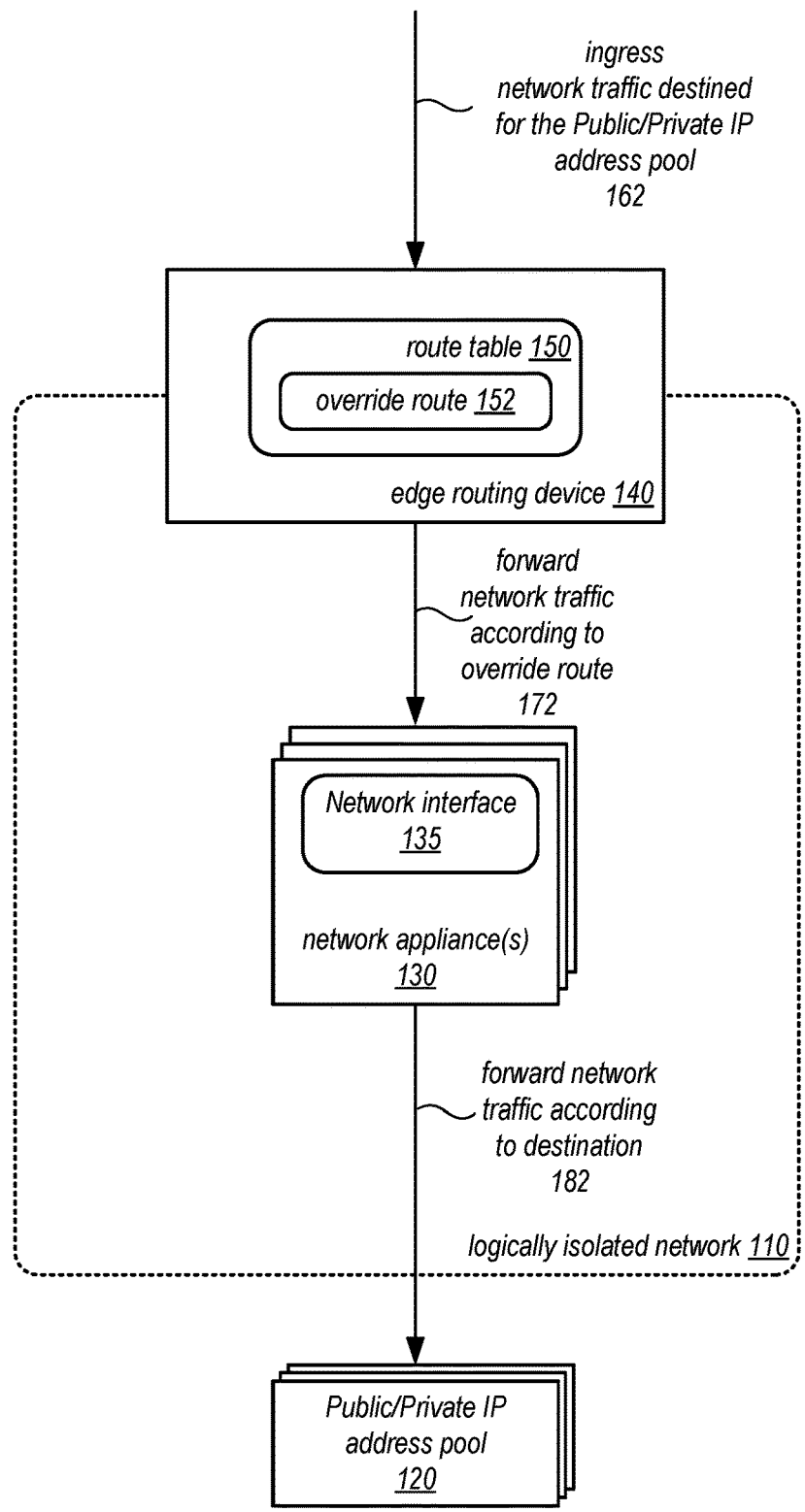
FIG. 1 is a logical block diagram of associating route tables with ingress traffic to logically isolated networks, where the ingress traffic is destined for a block of public or private IP addresses, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of routing ingress traffic for logically isolated networks that is destined for public or private IP blocks, where the ingress traffic is routed without performing a network address translation, for example from public to private IP addresses, are described herein. A provider network or other system or service may implement a network to allow clients, operators, users, or other customers to use, access, operate, or otherwise control one or more computing resources hosted within the network. These resources may include various types of computing systems or devices that can communicate over the network in order to perform various tasks, operations, or services on behalf of the clients. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (e.g., purchase or buy) one or more compute resources (such as compute instances) or utilize other resources to perform various functions, services, techniques, and/or applications.

A provider network may offer client accounts (e.g., customers, users, operators, or other entities) client account-specific security features, in various embodiments. For example, a logically isolated network (which may also be referred to in some environments as a virtual private cloud or "VPC") may include a collection of computing and/or other resources in a logically isolated section of the provider network, over which the entity (e.g., user account) using the logically isolated network is granted substantial control with respect to networking configuration. In some embodiments, for example, a customer may select the network address ranges (e.g., Internet Protocol (IP) address ranges or blocks via Classless Inter-Domain Routing ("CIDR") notation) to be used for the logically isolated network resources, manage the creation of overlay networks, such as subnets within the logically isolated network, and the configuration of route tables, gateways, etc. for the logically isolated network.

A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths.

A VPC is a virtual network dedicated to a particular customer account (or set of related customer accounts, such as different customer accounts belonging to the same business organization). A VPC is logically isolated from other virtual networks in the cloud. Customers can launch resources, such as compute instances, into a VPC. When creating a VPC, a customer can specify a range of IPV4 addresses for the VPC in the form of a Classless Inter-Domain Routing (CIDR) block. A VPC can span all of the availability zones in a particular region. After creating a VPC, a customer can add one or more subnets in each availability zone or edge location.

Subnets may offer client accounts of resources hosted in the subnet greater control to route network traffic among resources hosted within the subnet. For example, subnets may allow for the different types of network traffic to be diverted to different resources within the subnet in order to meet quality of service or other performance goals without requiring changes to the operation of substrate networks over or upon which the subnet is implemented, in some embodiments.

Associating route tables with ingress traffic to logically isolated networks may simplify the integration of security and other network appliances within a logically isolated network topology, in some embodiments. For example, network appliances may provide control over the routing path of network traffic and allow users to easily insert a standalone or series of security or other network appliances into the forwarding path of logically isolated network traffic in a prescribed manner. As a result, the capabilities of a logically isolated network can be expanded to include a wide variety of advanced features, such as threat detection, threat prevention, advanced firewall, and more, within the logically isolated network, unlike systems that do not support the association of routing tables with ingress traffic to a logically isolated network. Because network appliances provide service functions such as content filtering, threat detection and prevention, traffic optimization, a common set of network appliances may not supply the features best suited to different applications or systems. By associating route tables with ingress traffic to logically isolated networks, custom network appliances may be added and used within a logically isolated network, either individually or as an ordered sequence of network appliances composing a logical service, (sometimes known as service chains) that are tailored for individual applications in their logically isolated networks.

A provider network can also allow clients to use provider network resources to construct a provider-network-based 5G Open Radio Access Network ("O-RAN"), in some embodiments. A provider network client can connect its hardware and network management resources through the provider network to enable secure, rapid scaling and innovation as well as on-demand responsiveness to customers' wireless needs. A provider network client can thereby achieve agile and cost-effective operations while offering new practical applications of 5G, in some embodiments.

A provider network client can leverage the provider network's infrastructure and services to deploy a cloud-native 5G network which may, for example, comply with O-RAN standards or other applicable standards. For example, some or all of the antennas and radio access network, and the 5G Core, can be implemented on the provider network's infrastructure, in some embodiments. In other embodiments, RAN components may be implemented on edge infrastructure (e.g., Outposts), while the core can be run in region or also on the edge infrastructure (e.g., Outposts or local zones). The provider network can also power a client's automated Operation and Business Support Systems ("OSS" and "BSS") that will enable a client to provision and operate its customers' 5G workloads.

By building its 5G network on the provider network, a client is also simplifying the process for developers to create new 5G applications, in some embodiments. Developers can use the provider network to create innovative 5G solutions across a variety of industries by leveraging standardized application programming interfaces (APIs) to engage with data on a provider network such as user equipment latency, bit rate, quality of service, and equipment location. Developers can then leverage the provider network services and capabilities in machine learning, analytics, security, and more to create responsive solutions that use that data. For instance, a client can offer low-latency augmented reality gaming experiences optimized for the user's device, serve contextual advertising, or orchestrate the movements of a robot at a disaster site. A client can use the provider network to provide digital services harnessing the combined power of 5G connectivity and the services of the provider network, in some embodiments. The approach can upgrade wireless connectivity by allowing customers the ability to customize and scale their network experience on-demand, in some embodiments.

Running its 5G network over the provider network can allow a client to further reduce costs by bypassing the capital expenditure investments typically associated with building and operating network infrastructure hardware, in some embodiments. A provider network client can also apply the provider network machine learning capabilities at the network edge to help improve service by predicting network congestion at specific locations, as well as recognizing anomalies in network function, and then automatically take corrective actions to optimize performance, in some of these embodiments.

In order to implement a 5G network over a provider network, the provider network can in some embodiments facilitate the communication of data between user equipment, such as smartphones, and the Internet. One way to structure this communication infrastructure is to create a logically isolated network of the provider network which includes network appliances and infrastructure needed to process and route packets between the user equipment and the Internet, for example. This logically isolated network can associate the public and/or private IP addresses of the user equipment ("UEIPs") with the logically isolated network. In a broader context, the logically isolated network can associate any blocks of IP addresses with the logically isolated network, in some embodiments. The logically isolated network can advertise these blocks of IP addresses, such as the UEIPs, to the Internet, such that Internet traffic with a destination of an IP address within the block (such as one of the UEIPs) is routed to the logically isolated network. The Internet traffic can enter the logically isolated network via an edge routing device, such as an Internet gateway, in some embodiments.

An Internet Gateway ("IGW") associated with a logically isolated network of a client can accept and route this inbound Internet traffic destined for the public and/or private IP address blocks, in some embodiments. In a broader context, any kind of edge device, such as a Virtual Private Gateway ("VGW"), can accept and route inbound traffic entering the logically isolated network and destined for the public and/or private IP address blocks, in some embodiments. In some embodiments the network adjacent to the logically isolated network is not the Internet, but might be some sort of enterprise network. An edge device can accept and route inbound traffic entering the logically isolated network from this enterprise network and destined for the public and/or private IP address blocks, in some embodiments. The public and/or private IP address blocks might be address blocks within the same enterprise network from which the packets were inbound, or they might be IP address blocks within a different enterprise network, depending on the embodiment.

In some embodiments, the public IP address blocks are not associated with any specific network interfaces. This improves on other systems where the IGW only accepts traffic that is destined for public IPs associated with specific network interfaces inside the virtual private client, and where there is a limit on the number of IPs that could be associated with a specific network interface. But with this enhancement, some embodiments of a provider network can allow a client to route inbound traffic, such as Internet traffic, belonging to large pools of public and/or private IPs to a single network interface inside the logically isolated network, or to break the pool of public and/or private IPs into smaller chunks and to route each chunk to a different network interface.

In order to route incoming inbound traffic, such as incoming Internet traffic, destined for these public and/or private IP pools to a desired logically isolated network (such as a VPC), a provider network can allow route entries to be added to IGW route tables ("RTs"), in some embodiments. A route entry can have the public and/or private IP address pool as a destination, and the respective network interface as the target of the route. This improves on other systems in which IGW RTs only accept routes with a destination lying within the CIDR of the logically isolated network. But with this enhancement, some embodiments of an IGW RT can also accept routes to public and/or private IP address pools belonging to a client's account that contains the logically isolated network. The public and/or private IP pools can include IP addresses brought to the service by the client ("BYOIP"), or can include IP addresses allocated to the client by the provider network.

Since these public and/or private IP addresses in the public and/or private IP address pools are not associated with any specific network interface within the logically isolated network, the IGW does not perform any network address translation ("NAT") on the inbound traffic, in some embodiments. This NAT can be public-to-private NAT in some embodiments. In some of these embodiments, the IGW directly routes the inbound traffic to the target specified in the route entry. Similarly, for traffic leaving the logically isolated network, the IGW does not perform NAT if the source IP address of the outbound traffic belongs to this public and/or private IP address pool, in some embodiments. Therefore, once the routes are configured in these embodiments, an IGW will not perform any NAT, such as public-to-private NAT, on the inbound traffic, such as inbound Internet traffic destined for the aforementioned public and/or private IP pools, and will not perform any NAT, such as private-to-public NAT, on outbound traffic, such as outbound Internet traffic with a source belonging to these public and/or private IP pools. The IGW will just route the inbound traffic to the specified target in these embodiments.

In some embodiments, an IGW RT can have multiple routes with different destinations all pointing to the same target. An example of this scenario would be:

8.8.24.0/24→ni-5af16259
8.8.64.0/24→ni-5af16259
203.0.113.0/24→ni-5af16259
203.16.10.0/24→ni-5af16259

In other embodiments, an IGW RT can have multiple routes with different destinations, each pointing to a different target. An example of this kind of scenario would be:

8.8.24.0/24→ni-5af16259
8.8.64.0/24→ni-6bg27360
203.0.113.0/24→ni-7ch38471
203.16.10.0/24→ni-5af16259

In some embodiments, routes whose destination is a subset or a superset of an existing route can be configured. In some of these embodiments, the IGW RT will perform a longest prefix match to route that traffic. Therefore, a route 8.8.24.128/25→ni-5af1example1 will take priority over the route: 8.8.24.0/24→ni-77xtexample2. In some of these embodiments, the two aforementioned network interfaces can be present in two separate logically isolated networks. In these embodiments, two routes in two different logically isolated networks with exactly same destination but different targets will follow an unpredictable pattern. Therefore, in these embodiments, if the route 8.8.24.0/24→ni-5af1example1 is configured in VPC-1, for example, when 8.8.24.0/24→ni-77xtexample2 already exists in VPC-2, the traffic (even belonging to the same connection) will sometimes go to ni-Saf1example1 in VPC-1, and remaining times it will be routed to eni-77xtexample2 in VPC-2.

In some other embodiments, instead of or in addition to allowing an IGW associated with a logically isolated network of a client to accept and route inbound traffic, such as Internet traffic, destined for the public and/or private IP address blocks, a Virtual Private Gateway ("VGW") can accept and route inbound traffic entering the logically isolated network and destined for networks outside the logically isolated network. The inbound traffic can be received by the VGW from a VPN connection that uses the public Internet, or from a Direct Connect Gateway ("DXGW") that uses a provider network's direct connect functionality, in some embodiments. These embodiments allow a VGW of a logically isolated network to accept traffic destined for networks outside the logically isolated network, and to route the traffic to a network interface, or a gateway load balancer ("GWLB"). This improves on other systems where a VGW only routes traffic with destination belonging to the CIDR of the logically isolated network, and where routes cannot be entered in a VGW RT that are less specific than the CIDR of the logically isolated network. But with this enhancement, routed can be entered in a VGW RT that are less specific (or non-overlapping) than the CIDR of the logically isolated network.

Embodiments of Routing Ingress Traffic for Logically Isolated Networks that is Destined for Public and/or Private IP Blocks FIG. 1 is a logical block diagram of routing ingress traffic for logically isolated networks that is destined for public or private IP blocks, according to some embodiments. Logically isolated network 110 may be implemented within a provider network like provider network 200 in FIG. 2, or other systems or services that provide logical network isolation for resources hosted on computing systems, servers or nodes (e.g., computer system 1400 in FIG. 14). Resource(s) of the logically isolated network may be applications (or components thereof) for various storage, data processing, virtual computing, or other computing resources. The public/private IP address pool 120 comprises IP addresses belonging to the owner of the logically isolated network, or the account containing the logically isolated network. In the embodiment of routing 5G traffic using a provider network, the public/private IP address pool 120 might correspond to mobile devices' public or private IPs that lie outside the CIDR of the logically isolated network 110.

One (or more) network appliance(s) 130 may be implemented to provide various networking features to ingress (and egress) traffic directed to public/private IP address pools 120, in some embodiments. For example, network appliance(s) 130 may operate as an individual network appliance or chain of network appliance(s) or as a managed pool of network appliances scaled to satisfy ingress traffic demand upon logically isolated network 110, as discussed below. The network appliance(s) 130 can have a network interface 135 associated with one or more of the network appliance(s) 130.

Edge routing device 140 may be one (or one of multiple) routing devices or virtual routing devices that handle ingress network traffic to the logically isolated network 110 that is destined for the public/private IP address pool 162. The edge routing device 140 is capable of accepting and routing traffic that is destined for mobile-devices' public/private IPs 120 that lie outside the CIDR of the logically isolated network, and are not associated with any network interface or mapped to any private IP belonging to the CIDR of the logically isolated network. While the edge routing device 140 may encapsulate network packets of network traffic to include a substrate network header, in order to forward the network packets through substrate network device(s) upon which logically isolated network 110 is implemented as an overlay network, in some embodiments, the edge routing device 140 does not perform any NAT, such as public-to-private NAT, on the inbound traffic that is destined for public/private IP address pool 120, and instead directly routes it to the target specified in the route entry.

A route table, such as route table 150 may be associated with edge routing device 140 (e.g., as discussed below with regard to FIGS. 3-13), in order to forward network traffic to network appliance(s) 130. The forwarding of network traffic may be transparent to the sender of the network traffic, in various embodiments as well as transparent to the recipient. For example, override route 152 may be implemented to direct the forwarding of network packets destined for the public/private IP address pool 120 at edge routing device 140 to network appliance(s) 130 according to override route 152, without modifying the destination field of network packets. For example, override route 152 may specify that the target of traffic destined for the public/private IP address pool 120 is the network interface 135 associated with the network appliance 130. Edge routing device 140 may forward the network traffic 172 according to the override route 172 to network appliance(s) 130 (e.g., by forwarding network packets to the network interface 135 of network appliance(s) 130), which may perform various network appliance features or techniques (as discussed above) and then forward the traffic again 182 to either another network appliance, or to the IP address of the public/private IP address pool 120 (e.g., if the ingress traffic is not dropped or diverted depending upon the processing of the network traffic at network appliance(s) 130).

Please note that previous descriptions are not intended to be limiting, but are merely provided as an example of route tables, edge routing devices, network appliance(s), resource(s), and logically isolated networks. The number or arrangement of components may be implemented in many different ways.

This specification next includes a general description of a provider network, which may implement routing ingress traffic for logically isolated networks that is destined for public and/or private IP blocks, where the ingress traffic is routed without performing a network address translation, such as from public to private IP addresses. Then various examples of a provider network are discussed, including different components/modules, or arrangements of components/module that may be employed as part of routing ingress traffic for logically isolated networks, where the ingress traffic is destined for public and/or private IP blocks. A number of different methods and techniques to implement routing ingress traffic for logically isolated networks, where the ingress traffic is destined for public and/or private IP blocks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
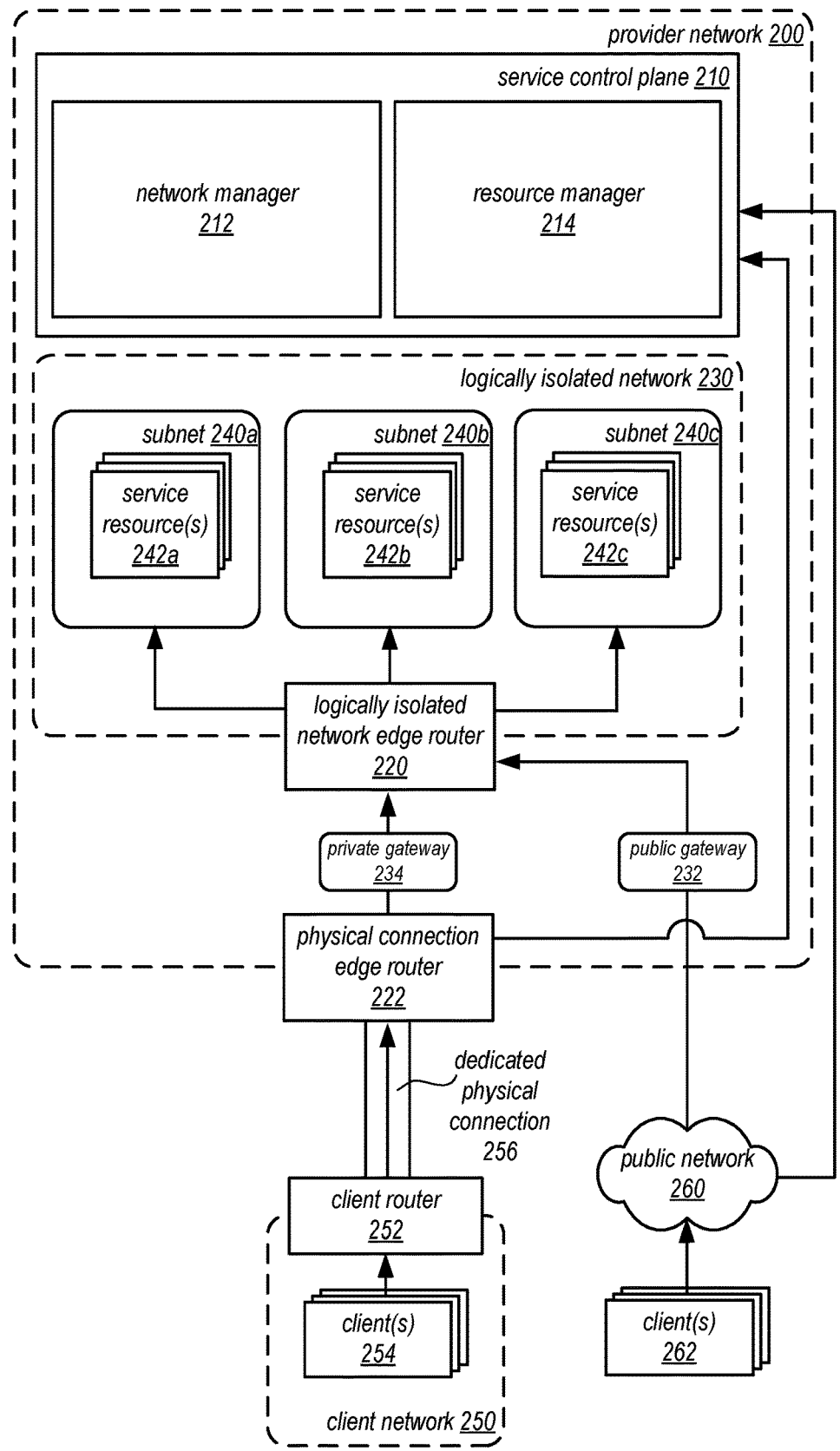
FIG. 2 is a logical block diagram of a provider network that implements associating route tables with ingress traffic to logically isolated networks of a provider network, according to some embodiments.

FIG. 2 is a logical block diagram of a provider network that implements associating route tables with ingress traffic to logically isolated networks of a provider network, according to some embodiments. Provider network 200 may offer various computing resources to clients, such as various types of data analysis, processing, and storage. Computationally intensive applications or systems may utilize multiple distributed computing resources in provider network 200 to provide scalable solutions for a variety of different computing applications. Provider network 200 may be may be set up by an entity such as a company or a public sector organization to provide one or more network-based services (such as various types of cloud-based computing or storage) accessible to clients (e.g., internal clients operating within provider network using provider network resources, or external clients, such as clients 262 via a public network 260 (e.g., the Internet), or clients 254 via a dedicated physical connection 256.

Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may implement multiple fault tolerant zones, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones). While grouped together in FIG. 2, different resources for a client network, such as resource(s) 242a, 242b, or 242c, may be distributed across fault tolerant zones (not illustrated), in some embodiments.

Provider network 200 may include the hardware (e.g., modems, routers, switches, load balancers, proxy servers, etc.) and software (e.g., protocol stacks, accounting software, firewall/security software, etc.) necessary to establish networking links between different components of provider network 200 as well as external networks (e.g., the Internet) or client networks with dedicated physical connections. In some embodiments, provider network 200 may employ an Internet Protocol (IP) tunneling technology to provide an overlay network via which encapsulated packets may be passed through the provider network 200 using tunnels (which may be a substrate network upon which other networks, like logically isolated network 230 and overlay networks, like subnets 240, may be implemented).

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time, but close enough together to meet a latency requirement for intra-region communications.

Furthermore, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

Like provider network 200, a client network 250 may offer or provide various applications or services to users of the client network 250, utilizing resources such as client devices 252. For example, client network 250 may be one or more internal networks for one (or multiple) companies, enterprises or organizations. In some embodiments, client network 250 may provide publicly available services, which may be accessible via a public network like the Internet. As part of providing the respective services or functions, client network 250 may utilize various resources offered by provider network 200.

In order to enable connectivity between a client network 250 and multiple resource(s), such as resources 242a, 242b, and 242n, a dedicated physical connection 256 may be implemented. For example, the dedicated physical connection may include one or cables physically linking a pair of co-located routers, one belonging to or managed by the provider network (e.g., physical connection edge router 222) and one belonging to or managed by a client network (e.g., client router 252). However in some embodiments, a third party or entity may operate one or both of physical connection edge router 222 or client router 252. In at least some embodiments, the physical connection edge router 222 and the client router 254 may be located within a co-location facility. However, in other embodiments the two routers may not be located within a same facility or location.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. Some outposts may be used as infrastructure of the telecommunications network itself, for example as a distributed unit of a private (standalone) or public (non-standalone) cellular network. In the on-premise example, the limited capacity of the outpost may be available for use only be the customer who owns the premises (and any other accounts allowed by the customer). In the telecommunications examples, the limited capacity of the outpost may be shared amongst a number of applications (e.g., games, virtual reality applications, healthcare applications) that send data to users of the telecommunications network. In contrast, a local zone can be multitenant and shared among a number of customers similar to a typical cloud provider availability zone.

An edge location such as a local zone or outpost can include data plane capacity controlled at least partly by a control plane of a nearby availability zone. As such, a "parent" availability zone can provide the control plane for a number of "child" edge locations homed to (e.g., controlled at least partly by the control plane of) the parent availability zone. Certain limited control plane functionality (e.g., features that require low latency communication with customer resources, and/or features that enable the edge location to continue functioning when temporarily disconnected from the parent availability zone) may also be present in some edge locations. Thus, in the above examples, an edge location refers to an extension of at least data plane capacity that is positioned at the edge of the cloud provider network, close to customer devices and/or workloads.

In various embodiments, dedicated physical connection 256 may be utilized to provide a connection and interface to resources 242 in a provider network 200 via a private gateway 234. In at least some embodiments, private gateway 234 may be a physical or virtual network gateway to access logically isolated network 230 according to a private connection, such as dedicated physical connection 256. For example, private gateway 234 may enforce or otherwise implement access controls or security protocols to ensure that the network traffic received through private gateway 234 remains private to the client and destination resource that are communicating. In order to establish a private gateway 234, control request that the private gateway 234 be established over the already established dedicated physical connection 256 can be received. Various parameters may have to be supplied to an administrative component of provider network 200, such as network manager 212, in some embodiments. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. Once established, various systems, components, or devices 254 in client network 250 may communicate with resources 242 through the private gateway 234.

In some embodiments, a VPN connection between a client implemented gateway within a client network 250 (not illustrated) could be established with private gateway 234 to provide a virtual private connection. Such communications could pass over a public network like public network 260, but may utilize private gateway 234 to access resources 240.

Public gateway 232 may provide a physical or virtual gateway that allows communications between resources 242 hosted within logically isolated network 230 and a public network, such as a wide area network like the Internet. For example, a subnet 240 may include a network route that points to public gateway 232 in order to allow traffic to and from resources in the subnet 240 via public network 260, in some embodiments.

Provider network 200 may allow for portions of provider network 200 to be provisioned as a logically isolated network 230 within or portion of provider network 200, in order to allow a customer or user associated with a client account to specify the configuration of the provider network, utilizing features such as specifying a range of network addresses (e.g., via a CIDR block), creation of overlay networks, such as subnets 240a, 240b, and 240c (which may be specified with different CIDR blocks), create and/or manage network route tables and gateways (e.g., like public gateway 232 and private gateway 234) as well as associate route tables for ingress traffic to a logically isolated network, as discussed in detail below. One or more network devices, such as logically isolated network edge router 220, may implement or enforce the specified network configuration, such as handling requests received via private gateway 234 and public gateway 232 according to the parameters or configuration of those gateways, in some embodiments.

Service resources, such as service resources 242a, 242b, 242c, may be resources of one or multiple different services offered by provider network 200 (e.g., virtual compute, data processing, data storage, etc.). Provider network 200 may implement one (or more) of service control plane 210 to manage the various resources 242 offered by provider network 200. Service control plane 210 may be implemented by various collections servers, nodes, computing systems or devices, such as may be generally described below with regard to computing system 1400 in FIG. 14. Service control plane 210 may implement an interface which may be accessible either by client devices 254 over dedicated physical connection 256, or by client devices 262 using public network 260 (which may be associated with client network 250 or linked to common client accounts of the different client networks). The interface may dispatch requests to the appropriate service control plane component(s) to handle the requests such as requests to procure, reserve, enable, disable, configure, or otherwise manage the resources 242 dispatched to resource manager 214 and/or various network management requests sent to network manager 212 to manage logically isolated network 230 and/or subnets 240. For example, the interface may provide the various interfaces described below with regard to FIG. 4. The interface may be programmatic, such as may be implemented by an Application Programming Interface (API), command line interface, and/or a graphical user interface (GUI), in some embodiments.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In at least some embodiments, service control plane 210 may implement various resource management functions as part of resource manager 214. For example, creating/launching and configuring the various resources 242 may be internally managed and performed by resource manager 214. Other control plane function(s) may also be implemented by other management components not illustrated, and may include authenticating client(s) (e.g., associating them with particular client accounts), metering resource usage for different client networks, billing client accounts associated with the client networks, and any other management or control functions to provide the various services of provider network 200.

Service control plane 210 may implement network manager 212, as discussed in more detail below with regard to FIG. 4 to manage logically isolated networks and subnets for resources 242. In some embodiments, network manager 212 may be implemented as a separate service from the resource host service (e.g., utilizing a separate control plane to manage servers, hosts, or other computing devices that manage networks and a separate data plane to store network management information (e.g., routing tables, access rules, etc.). Thus, the previous example architecture is not intended to be limiting.

In various embodiments, clients 254 or 262 may encompass any type of client that can utilize, manage, operate or configure connections or resources in provider network 200. For example, a client may implement various tools, scripts, or other modules that may be able to configure a respective logically isolated network 230 or overlay network 240. As part of managing the networks, clients 254 or 262 may submit various requests to provider network 200 via an interface for service control plane. In order submit requests to provider network 200, a client may include a suitable version of a web browser, or may include a plug-in module or other type of code module configured to execute as an extension to or within an execution environment provided by a web browser. Alternatively, a client may encompass an application such as a resource/connection management or information client (or user interface thereof) that may make use of provider network 200 to manage various resources and connections. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 262 may be configured to generate network-based services requests according to a Representational State Transfer (REST)-style network-based services architecture, a document-or message-based network-based services architecture, or another suitable network-based services architecture In some embodiments clients 262 may convey requests to provider network 200 via a public network 260, which may be a public connection to provider network 200. In various embodiments, the public network 260 may encompass any suitable combination of networking hardware and protocols necessary to establish network-based communications between clients 262 and provider network 200. For example, a network may generally encompass the various telecommunications networks and service providers that collectively implement the Internet. A network may also include private networks such as local area networks (LANs) or wide area networks (WANs) as well as public or private wireless networks.

Figure 3:
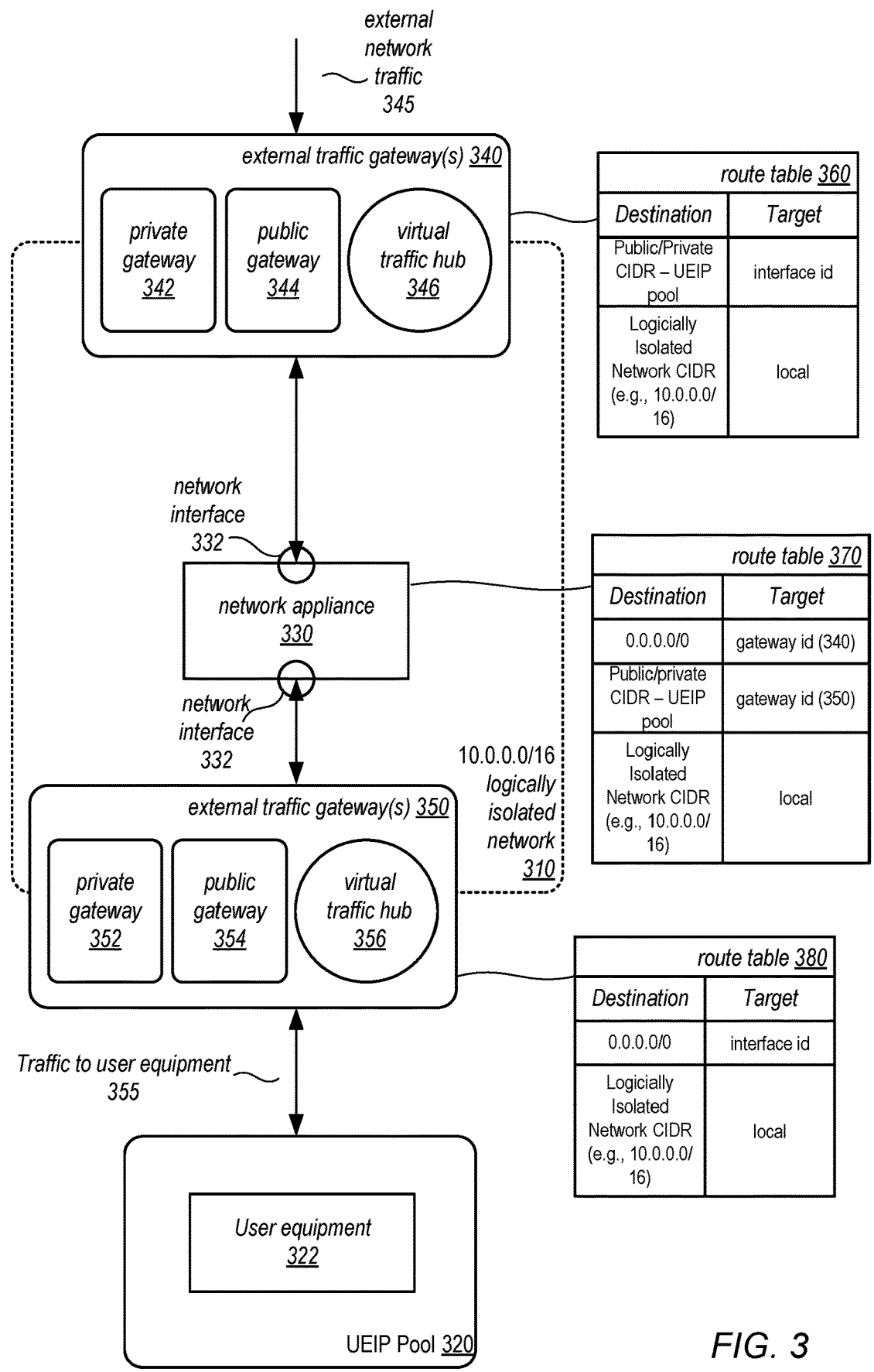
FIG. 3 is logical block diagram illustrating additional details of routing external ingress traffic to logically isolated networks using route tables, where the ingress traffic is destined for a block of public or private IP addresses, and where the ingress traffic is routed without performing a network address translation, according to some embodiments.

FIG. 3 is logical block diagram illustrating routing ingress traffic for logically isolated networks that is destined for public and/or private IP blocks, where the ingress traffic is routed without performing a network address translation, such as from public to private IP addresses, according to some embodiments. Logically isolated network 310 may comprise a network appliance 330 with network interfaces 332. The User Equipment IP address ("UEIP") pool 320 comprises IP addresses belonging to the owner of the logically isolated network, or the account containing the logically isolated network. In the embodiment of routing 5G traffic using a provider network, for example, the public/private IP address pool 120 might correspond to mobile devices' public and/or private IPs that lie outside the CIDR of the logically isolated network 110.

To provide access to logically isolated network 310, one (or more) of various external traffic gateways (340, 350) may be created and associated with logically isolated network 310, such as private gateway (342, 352) (similar to private gateway 234 in FIG. 2), public gateway (344, 354) (similar to public gateway 232 in FIG. 2) or other traffic routing and gateway features, such as virtual traffic hub (346, 356). Virtual traffic hub (346, 356) may connect to multiple logically isolated networks (not illustrated), which may be programmatically attached in a hub-and-spoke configuration to virtual traffic hub (346, 356), in various embodiments, so that the routing/forwarding of network packets from one attached logically isolated network to another is managed by nodes of a virtual traffic hub (346, 356) based on metadata and/or policies provided by the creating/using clients. applications, entities, and/or systems. Virtual traffic hub (346, 356) may also be referred to as a transit gateway in some embodiments.

Logically isolated networks attached to virtual traffic hub (346, 356), such as logically isolated network 310, may allow network configuration settings (e.g., network addresses assigned to resources within a given network, subnet configurations, security settings and the like) to be set independently for the different networks, without having to take other networks' configuration settings into account. For example, a range of isolated network addresses selected for resources within one isolated network may happen to overlap with a range of private network addresses selected for resources within another isolated network in various embodiments, since the two address ranges are selected independently. According to some embodiments, the metadata taken into consideration at virtual traffic hub (346, 356) set up on behalf of a given client to manage traffic flowing between various isolated networks may include multiple route tables provided by the client (and/or route tables generated at the virtual traffic hub (346, 356) based on other input provided by the client, such as forwarding information base (FIB) entries from which route table entries may be derived.) After the appropriate route tables have been associated and populated with entries, traffic may be allowed to start flowing between the isolated networks via virtual traffic hub (346, 356) in various embodiments.

A user may create, launch or provision a network appliance, like network appliance 330 in logically isolated network 310. For example, different types of network appliances may be offered by a service of provider network 200, which may be selectable (e.g., via an interface, such as graphical user interface (GUI) implemented as part of a web console or programmatic interfaces). Network appliance 330 may be selected from the different offered types and deployed on provider network 200 resources for logically isolated network 310. In some embodiments, network appliance 330 may be one of a pool of network appliances managed by network manager 212 to provide a network appliance feature (e.g., filter, firewall, etc.) that is scalable to meet the demand to logically isolated network traffic (and possibly other resources in other logically isolated networks), providing a multi-tenant, traffic management service that dynamically scales by adding or removing network appliances to the pool according to demand. As discussed below, network manager 212 may select or identify which network appliance from the pool of network appliances may be used for logically isolated network (e.g., when a request to add a network appliance to logically isolated network 310 is sent to network manager 212 from a user or on-demand when network traffic is received at the external gateway 340). Therefore, in some embodiments, network appliance 330 may differ for some network packets directed to the same user equipment 322, UEIP pool 320, and/or logically isolated network 310.

Network appliance 330 may be associated or located within logically isolated network 310 using a network interface 332, in some embodiments, which may be specified according to a network interface id. For example, network interface 332 may be implemented as a virtual network device (e.g., a virtual network interface card (NIC) which can be used as a network endpoint (e.g., a network identifier or address) to which traffic directed to network appliance 330 can be sent and which network manager 212 has configured substrate network devices to forward to the resources implementing network appliance 330 according to the network address or identifier of network interface 332.

To route traffic through network appliance 330 (both ingress and egress), a route table 360 may be associated with an external traffic gateway 340. Route table 360 may be specified using one or more requests (e.g., discussed below in FIG. 4) to include a route for external network traffic (345) with a destination of a public and/or private CIDR or UEIP pool 320, to be targeted to and thus forwarded to network appliance 330, by including in the route the identifier for network interface 332 to override the destination. Route table 380 may be specified using one or more requests (e.g., discussed below in FIG. 4) to include a route for general IP traffic where the destination is not the public and/or private CIDR or UEIP pool 320, to be targeted to and thus forwarded to network appliance 330, by including in the route the identifier for network interface 332 to override the destination.

When ingress network traffic is received at a routing device for the associated external traffic gateway 340, the override route may be applied to the destination specified in the substrate network by routing the ingress traffic destined for the UEIP pool 320 to the network interface 332. When ingress network traffic is received at a routing device for the associated external traffic gateway 350, the override route may be applied to the destination specified in the substrate network by routing the ingress traffic destined for an external network, such as the general Internet, to the network interface 332. In some of these embodiments the network packet is not encapsulated with the substrate network address of network appliance 330, or a substrate network address for host system(s) of any computing resource(s), as no NAT is performed by the external traffic gateway 340 to translate the IP addresses, such as from public to private.

Route table 370 may also be updated for network appliance 330 to route ingress traffic to subnet 310, to the UEIP pool, or toward an external network such as the Internet. For example, in a first set of embodiments, route table 370 may specify a route with local traffic in the logically isolated network (e.g., specified by logically isolated network CIDR 10.0.0.0/16) to the appropriate local address. For egress traffic (e.g., destination 0.0.0.0/0), the gateway identifier of external gateway 340 may be specified, in this first set of embodiments. For traffic to the UEIP pool, the gateway identifier of external gateway 350 may be specified, in this first set of embodiments. In other embodiments, the network appliance 330 might forward the packet to another network appliance whose route table then routes the packet to the appropriate destination, as described above for the first set of embodiments. In still other embodiments, the network appliance 330 may encapsulate the packet with an encapsulated destination of another network appliance of the isolated virtual network that is closer to the user equipment, route the packet to the other network equipment, and this other network equipment might de-encapsulate the packet before sending it to appropriate destination, as network appliance 330 did in the first set of embodiments. Route table 380 may be updated for UEIP 320 to route ingress traffic from the user equipment 322 back through network appliance 330 of the logically isolated network, in some embodiments. For example, traffic directed to the logically isolated network CIDR (e.g., 10.0.0.0/16) may be directed locally, while egress traffic to an external network, such as the general Internet, can be directed to the network interface 332 by the interface id.

In some embodiments, different subnets may be implemented in different fault tolerant zones within the same logically isolated network, such as logically isolated network 310. Therefore, a separate route and network appliance (configured as illustrated in FIG. 3) may be implemented in some embodiments in order to route network packets directed to user equipment in different fault tolerant zones through the network appliance implemented in the corresponding fault tolerant zone.

Although not illustrated in FIG. 3, a chain of network appliances 330 can be implemented between a gateway for a logically isolated network and the user equipment 322 and subnet 320. For example, instead of pointing the local traffic to the UEIP poo. 320 in route table 370, local traffic may be pointed to a network identifier of a network interface for another network appliance, which can in turn direct local traffic to UEIP pool 320 in a route table or to another network appliance in the chain.

Figure 4:
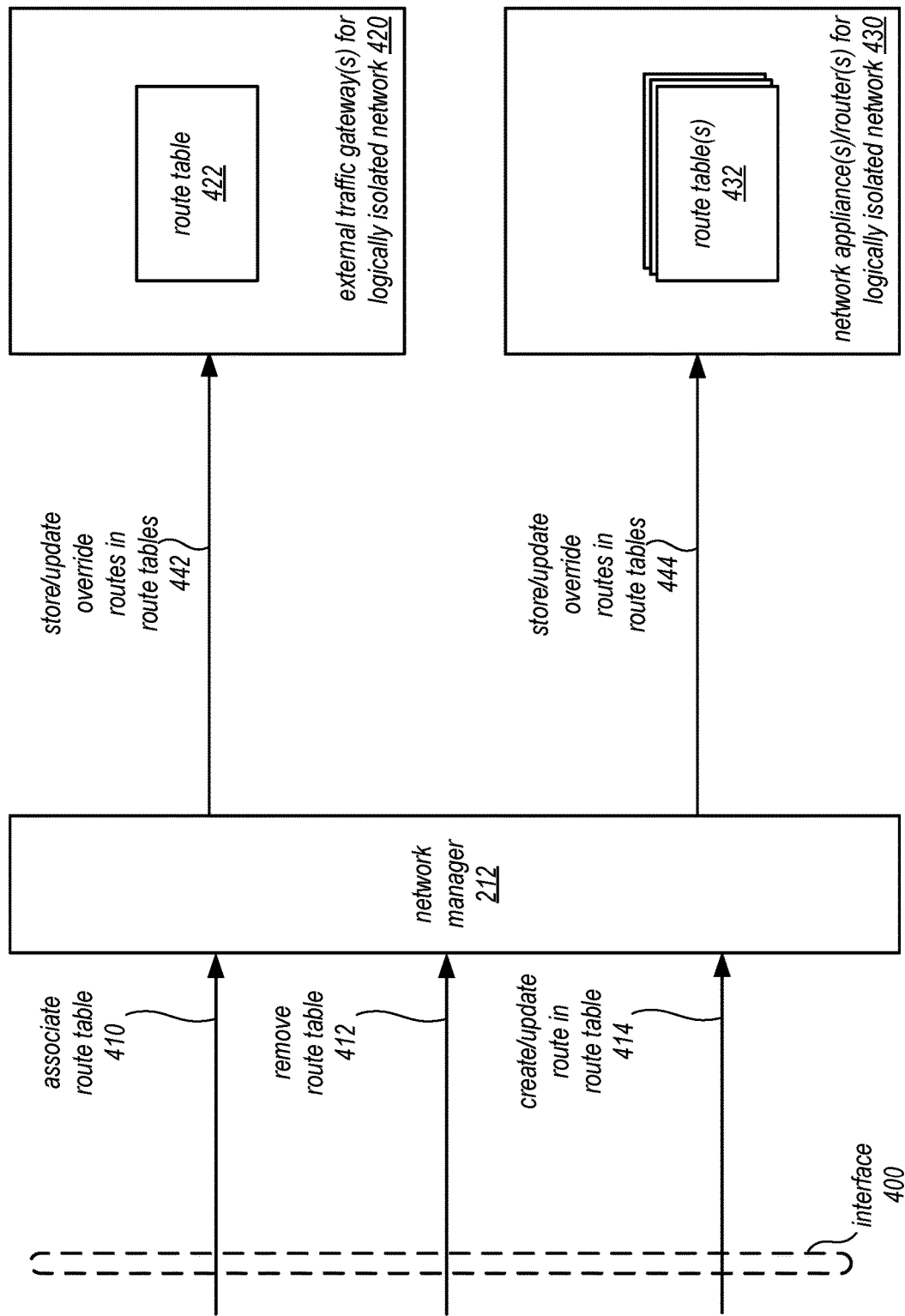
FIG. 4 is logical block diagram illustrating interactions to manage associated route tables with ingress traffic to logically isolated networks, according to some embodiments.

FIG. 4 is logical block diagram illustrating interactions to manage associated route tables with ingress traffic to logically isolated networks, where the ingress traffic might be destined for blocks of public and/or private IP addresses, according to some embodiments. Interface 400 may be implemented as part of a control plane or service interface, as discussed above with regard to FIG. 2, in order to allow users of a provider network to perform various operations to configure networking and other resources offered by provider network 200. Interface 400 may be a programmatic interface, which may be accessible via a graphical user interface (GUI) (e.g., implemented as part of a web-based administrator console for a logically isolated network and resources), a command line interface, and/or one or more Application Programming Interfaces (APIs), in some embodiments.

A request to associate a route table 410 may be sent to network manager 212 in order to identify a route table (e.g., by an identifier) that may be associated with various entities or objects within provider network. For example, various created (or to be created) external traffic gateways or connections provided by private network gateways, public network gateways, or virtual traffic hubs, as discussed above with regard to FIG. 3 may be identified (e.g., by an identifier) as a parameter of request 410. In this way, a route table may be associated with ingress traffic received via the gateways or connections identified. Network manager 212 may update control plane data (e.g., a database or other data store that manages, stores, or otherwise maintains routing information including route tables), in some embodiments, responsive to the requests. Network manager 212 may perform the appropriate requests to store or update information in route tables 422 and 432 at edge routers for a logically isolated network 420. The edge routers may perform substrate network routing via an encapsulation of network packets received and directed to the logically isolated network and the use of NAT to private addresses, or the edge routers can route ingress traffic for logically isolated networks that is destined for public and/or private IP blocks, where the ingress traffic is routed in the logically isolated network without performing a NAT, such as from public to private IP addresses. Network appliances and/or router(s) for the logically isolated network 430 may perform internal substrate network routing via an encapsulation of network packets received and directed to the logically isolated network, or can also can route ingress traffic for logically isolated networks that is destined for public and/or private IP blocks, where the ingress traffic is routed in the logically isolated network without performing a NAT, such as from public to private IP addresses. Network appliances and/or router(s) for the logically isolated network 430 can also apply network features (e.g., traffic shaping, packet inspection, or other network appliance features). For example, as discussed below with regard to FIG. 13, network manager 212 may determine override routes for associating route tables with an edge router 420 and network appliance(s)/routers 430 and store or update 442 and 444 the route tables 422 and/or 432 accordingly, in some embodiments (e.g., by providing a substrate network address for the network appliance to override or otherwise replace the substrate network address of a host system for a computing resource).

As indicated at 412, a request to remove a route table 412 may be received via interface 400 at network manger 212. The request to remove the route table may trigger actions to update the route tables 422 and 432, and may cause the edge routers 420 and network appliance(s)/router(s) 430 to default to remaining routes, in some embodiments. For example, removal of the associated route table may cause an edge router to again route ingress network traffic to the computing resource by encapsulating network packets with a substrate network address for a host system that hosts the computing resource.

As indicated at 414, a request to create or update a route in a route table 414 may be received via interface 400 at network manager 212. Request 414 may identify the network appliance by a network interface identifier, for instance, so that the route may be a route that points to the network interface of the network appliance, as discussed above with regard to FIG. 3. As noted above, network manager 212 may perform the appropriate requests to store or update information in route tables 422 and 432 at edge routers for a logically isolated network 420 and network appliances and/or router(s) for logically isolated network 430 which may perform internal routing and/or applying network features, including the determination of override routes.

Figure 5:
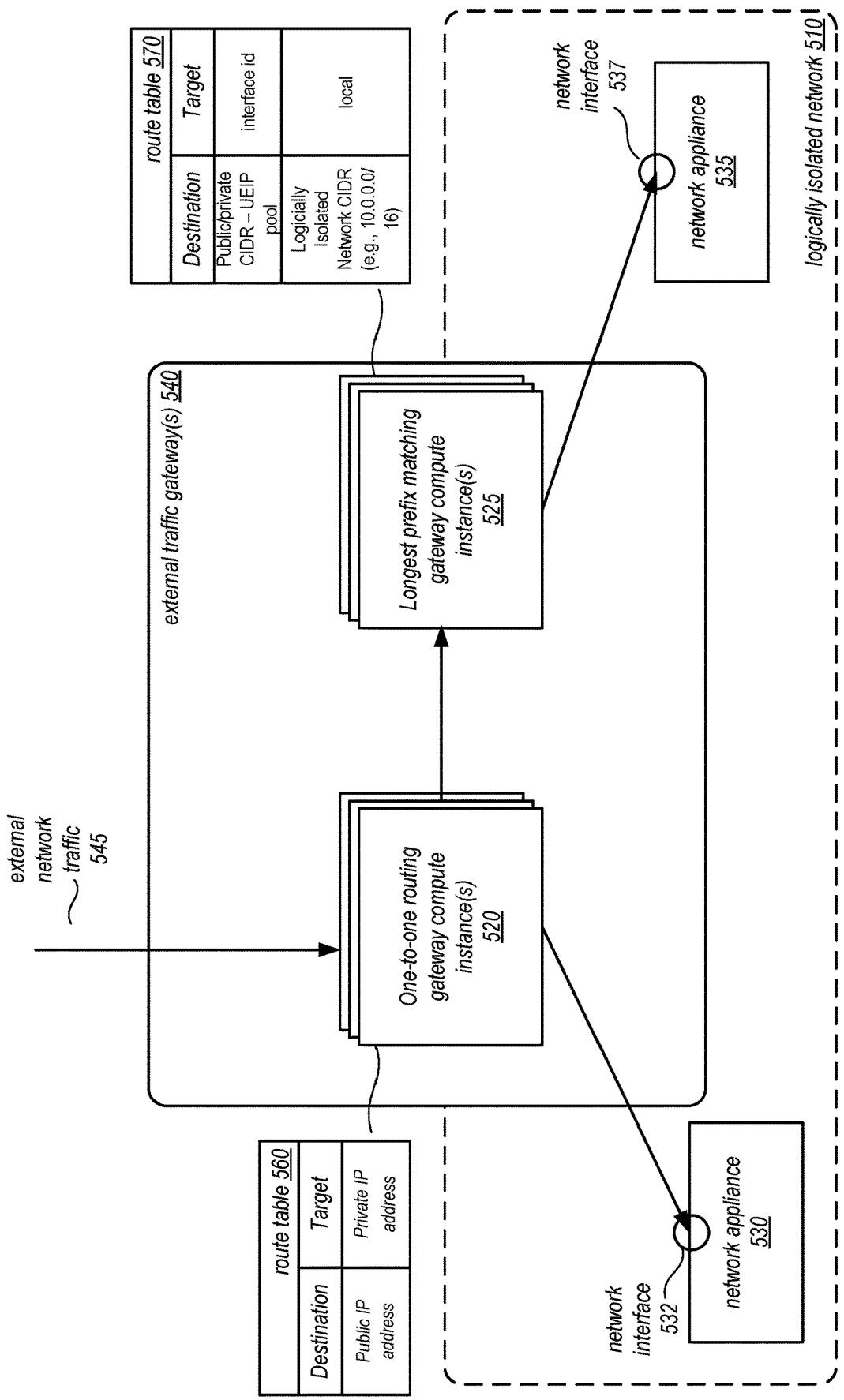
FIG. 5 is a logical block diagram illustrating traffic flow through an external traffic gateway(s) of a logically isolated network that divides up the compute instances that make up an external traffic gateway into two pools: one pool for 1-to-1 mappings of addresses where a NAT occurs, and the other pool for longest-prefix-matching routing where a NAT does not occur, according to some embodiments.

FIG. 5 is a logical block diagram illustrating traffic flow through an external traffic gateway(s) of a logically isolated network that divides up the compute instances that make up an external traffic gateway (such as the IGW) into two pools: one pool for 1-to-1 mappings of addresses where a NAT occurs, and the other pool for longest-prefix-matching routing where a NAT does not occur, in some embodiments. Previously, an external traffic gateway, such as Internet gateway, provided all 1-to-1 mappings. These 1-to-1 mappings could be from public IP addresses to the private IP addresses of the logically isolated network, for example. This is simple to implement, because the external traffic gateway is always performing 1-to-1 mappings. This is referred to as constant time lookup, in some embodiments.

However, routing ingress traffic for logically isolated networks that is destined for public and/or private IP blocks requires longest prefix match routing. With longest prefix match routing, the destination CIDR can be of arbitrary length. For IPV4 addresses, for example, the destination CIDR could be a /24 or /26 or /12, for example. A /12 IPv4 address, for example, means that only the first 12 bits of the 32 bit address are matched, and the remaining 20 bits of the address can be of any value. Adding the requirement of performing generalized longest prefix match for the external traffic gateway (such as the IGW or VGW), makes the implementation of the gateway much more challenging. The longest prefix match computation becomes non-constant time. One does not know how deep in the route table one has to go to perform longest prefix match.

Therefore, instead of trying to the non-constant time lookup of the longest prefix match in the same fleet of compute devices or instances that are performing the constant-time lookup, FIG. 5 shows dividing the problem up into two fleets, according to some embodiments. Compute instance fleet 520 performs the constant time processing, and compute instance fleet 525 performs the non-constant time lookup. Fleet 520 is connected to the external network traffic 545, where the ingress traffic from the external sources specifies a destination. When fleet 520 determines that an ingress packet requires a non-constant time processing, fleet 520 sends the packet to fleet 525. Fleet 525 performs the non-constant time processing of the packet, such as longest prefix match of the destination. Fleet 525 can be optimized for performing longest prefix matching, in some embodiments. In some embodiments, fleet 525 can grow and shrink in compute instances as the load grows and shrinks. This splitting of responsibilities increases the overall performance of the external traffic gateway 540.

Fleet 520 can perform 1-to-1 constant time processing on the destination address of an ingress packet, by converting the address from a public IP address to a private IP address of the logically isolated network 510, for example. This packet can then be routed to the private network address within the logically isolated network 510. For example, the private IP address might be to network interface 532 of network appliance 530, as shown in FIG. 5. In this case, the traffic would then be routed to the appropriate network interface 332. Fleet 525 can perform longest prefix matching non-constant processing on the destination address of an ingress packet, by routing the packet destined for a public and/or private IP CIDR (such as a UEIP pool) to an interface ID which is the target of the destination in the route table 570, for example. This packet can then be routed to the to the network interface 537 of network appliance 535, for example, as specified by the route table 570, without converting the network address to a private network address of the logicially isolated network.

Figure 6:
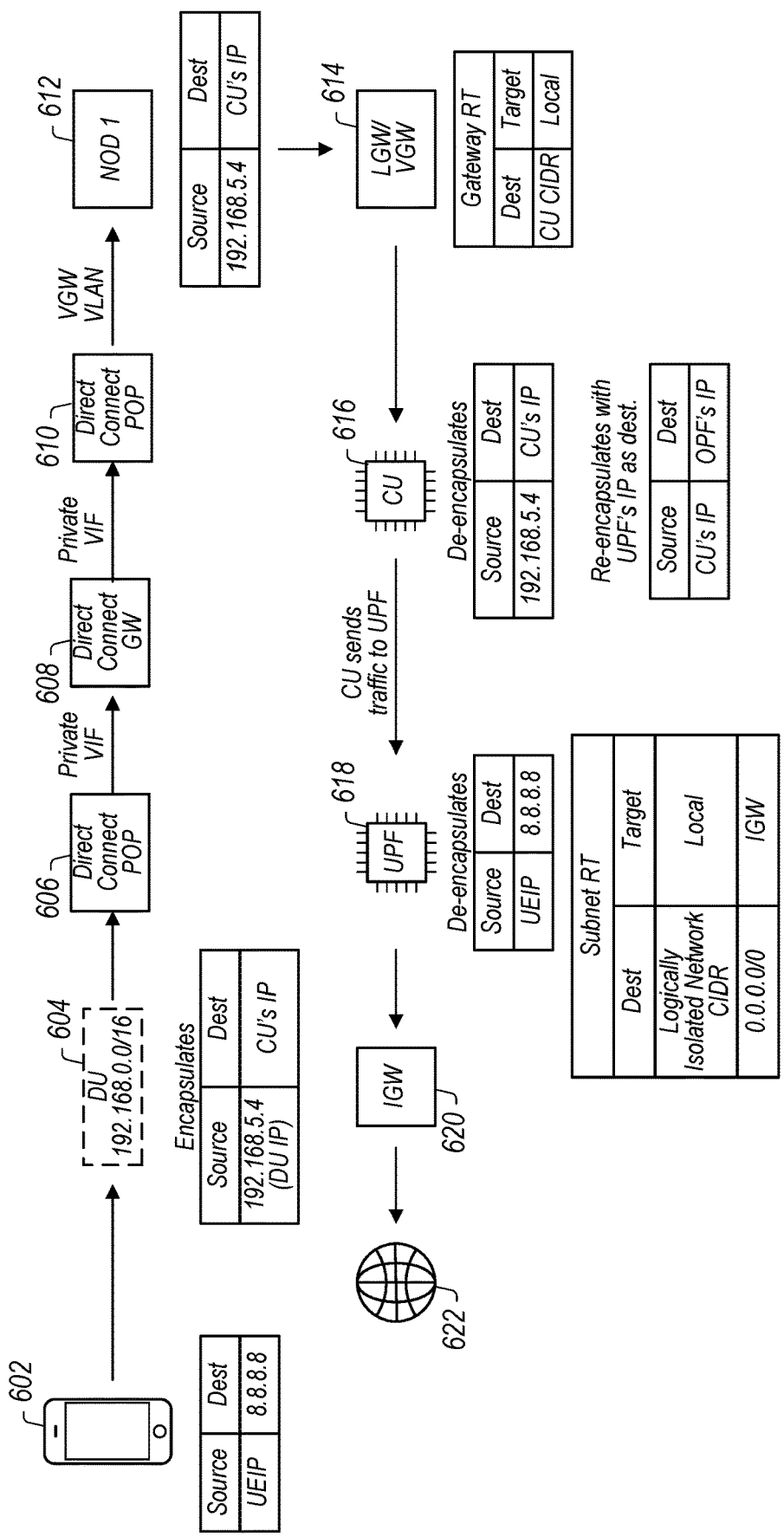
FIG. 6 is a logical block diagram illustrating traffic flow through an isolated virtual network that originated in a user device, where the user device is addressed by a public IP address within a block of public IP addresses that is associated with the isolated virtual network, and where the traffic is destined for the Internet, according to some embodiments.

FIG. 6 is a logical block diagram illustrating traffic flow through an isolated virtual network that originated in a user device, where the user device is addressed by a public IP address within a block of public IP addresses that is associated with the isolated virtual network, and where the traffic is destined for the Internet, according to some embodiments.

Figure 7:
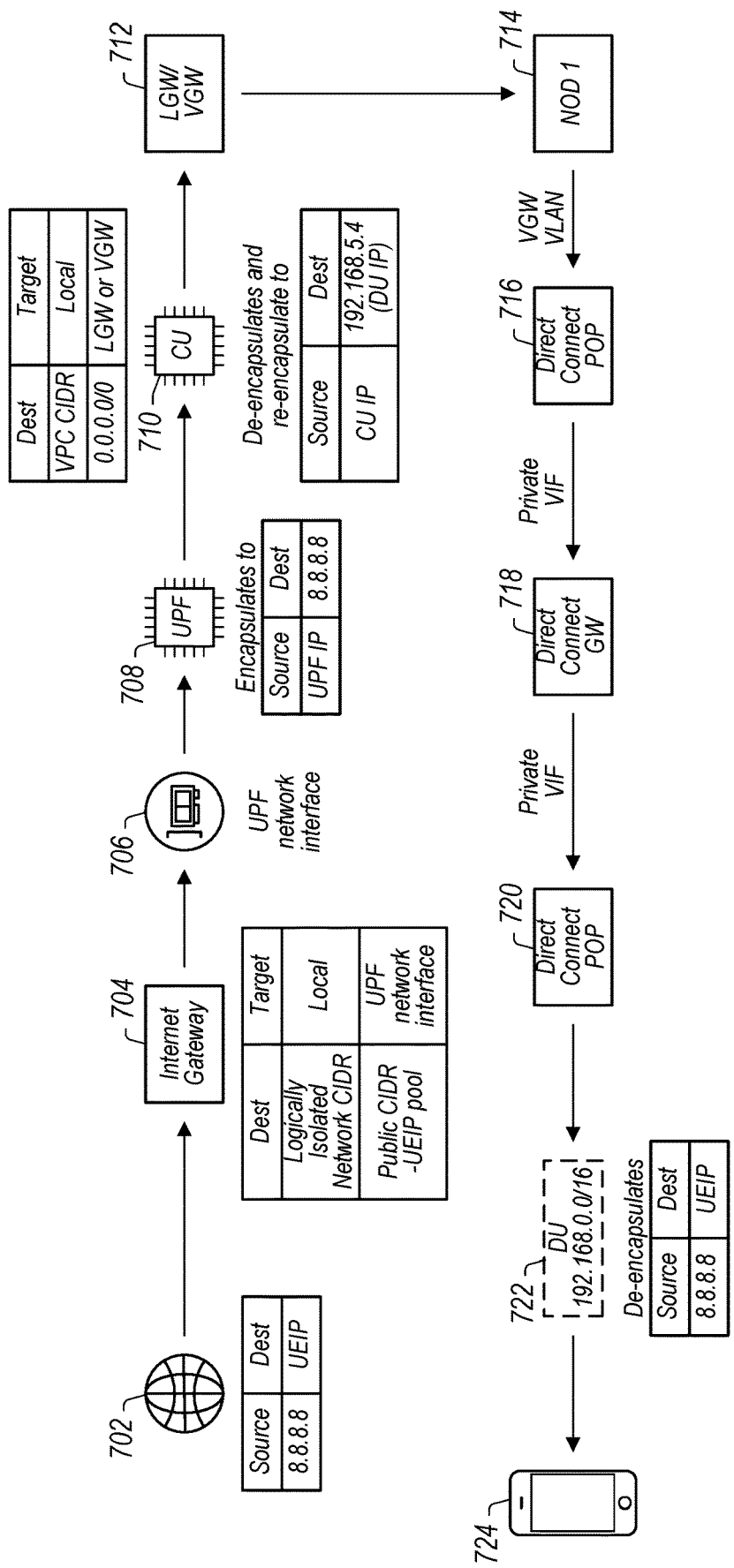
FIG. 7 is a logical block diagram illustrating traffic flow through an isolated virtual network that originated in the Internet and destined for a user device, where the user device is addressed by a public IP address within a block of public IP addresses that is associated with the isolated virtual network, and where the ingress Internet traffic is routed without performing a network address translation from public to private IP addresses, according to some embodiments.

Such a system as illustrated in FIGS. 6 and 7 can be used to implement a 5G O-RAN network over a provider network, in order to provide mobile phone connectivity to end users using a logically isolated network of a provider network, in some embodiments. At a high level, the infrastructure of FIG. 6 is composed of a Radio Access Network ("RAN") and a Core Network. The RAN network consists of the following three important components: Radio Unit ("RU") which is physical Antenna unit (spotted on top of buildings), Distributed Unit ("DU") which is hosted on-premises, and Centralized Unit ("CU") which would be collocated with UPF in local zones.

The Core Network comprises Control Plane functions and a User Plane Function ("UPF"), in some embodiments. UPF is an application which processes and forwards traffic to/from hundreds of thousands of mobile devices (mobile phones, tablets, etc.). The UPF network interface needs to send out and receive public traffic without any public to private translation. To facilitate this, FIG. 6 will allow: a) traffic to be sent to the Internet from the logically isolated network using an IGW without the IGW performing any private-to-public NAT; and b) allow, for the response traffic, non-overlapping routes destined for public IP prefixes to be entered in the IGW route table, and enable the IGW to route this ingress traffic to the specified target network interface without performing public-to-private NAT on this traffic.

First in FIG. 6, traffic destined for the Internet 622, say for 8.8.8.8, originates in user device (or user equipment) 602. Therefore, source address=UEIP (public IP of the user equipment device) and destination address=8.8.8.8. Second in FIG. 6, this traffic goes to a DU 604 which encapsulates the traffic with source=DU's own IP address, and destination=CU's (616) IP address. Both of these are private IP addresses. The CU 616 is hosted in the VPC. Third in FIG. 6, the traffic flows through multiple hops-a Direct Connect point-of-presence ("POP") 606 to a Direct Connect gateway ("GW") 608, to a Direct Connect POP 610, to a network-on-demand ("NOD") 612, to a logically isolated network via a local gateway ("LGW") or a virtual private gateway ("VGW") 614. Fourth in FIG. 6, the CU 616 routes the traffic to the UPF 618 by de-encapsulating it and re-encapsulating it with UPF's IP as the destination and CU's IP as the source. The UPF 618 de-capsulates the traffic (so that the source IP=UEIP, and the destination IP=8.8.8.8 after de-capsulation). This traffic follows the default route and exits via the IGW 620 to the Internet 622. The IGW does not perform any private-to-public NAT on the source IP of this outbound traffic. In other words, the IGW 620 does not perform any private-to-public NAT on select egress VPC traffic whose source IP=UEIP. However, the IGW can verify that the source IP is from the prefix allocated to a client's account to prevent spoofing, in some embodiment.

FIG. 7 is a logical block diagram illustrating traffic flow through an isolated virtual network that originated in the Internet and destined for a user device, where the user device is addressed by a public IP address within a block of public IP addresses that is associated with the isolated virtual network, and where the ingress Internet traffic is routed without performing a network address translation from public to private IP addresses, according to some embodiments. With the system of FIG. 7, routes on the IGW route table can be entered with a destination=public IP prefix/CIDR (UEIP pool), and a target=network interface. The IGW 604 will directly route the corresponding traffic to this target network interface without performing any public-to-private NAT. IN addition, the IGW 604 will not perform private-to-public NAT on the traffic leaving the VPC with source=UEIP.

First in FIG. 7, the internet (8.8.8.8) 702 sends a response traffic packet destined for UEIP. The network appliances of the logically isolated network advertise the UEIPs, and thus the traffic enters the logically isolated network via IGW 704. Second in FIG. 7, the traffic packets with UEIP as the destination to retain their public destination IP, and are routed to the UPF network interface 706. To achieve this, there is an Ingress Routing variant that allows traffic destined for public IP prefixes (UEIP) to be targeted to the UPF network interface 706. This is different than other systems where the IGW translates the public destination IP of the inbound internet traffic to the corresponding mapped private IP and the traffic follows the local route. Third in FIG. 7, the UPF network interface 706 carry the traffic to UPF 708. The UPF 708 encapsulates the traffic with source=UPF IP and destination=CU IP. The packet flows to CU 710 which de-encapsulates it and re-encapsulates it with source=CU IP and destination=DU IP. The default route carries the traffic to LGW/VGW 712. Fourth in FIG. 7, the LGW/VGW 712 routes the traffic destined for DU 722 via a NOD 714 to a direct connect POP 716, to a direct connect GW 718, to a direct connect POP 720, to the DU 722. Fifth in FIG. 7, the DU 722 de-encapsulates the packet and sends it to the end-user device 724 that is associated with the UEIP.

Figure 8:
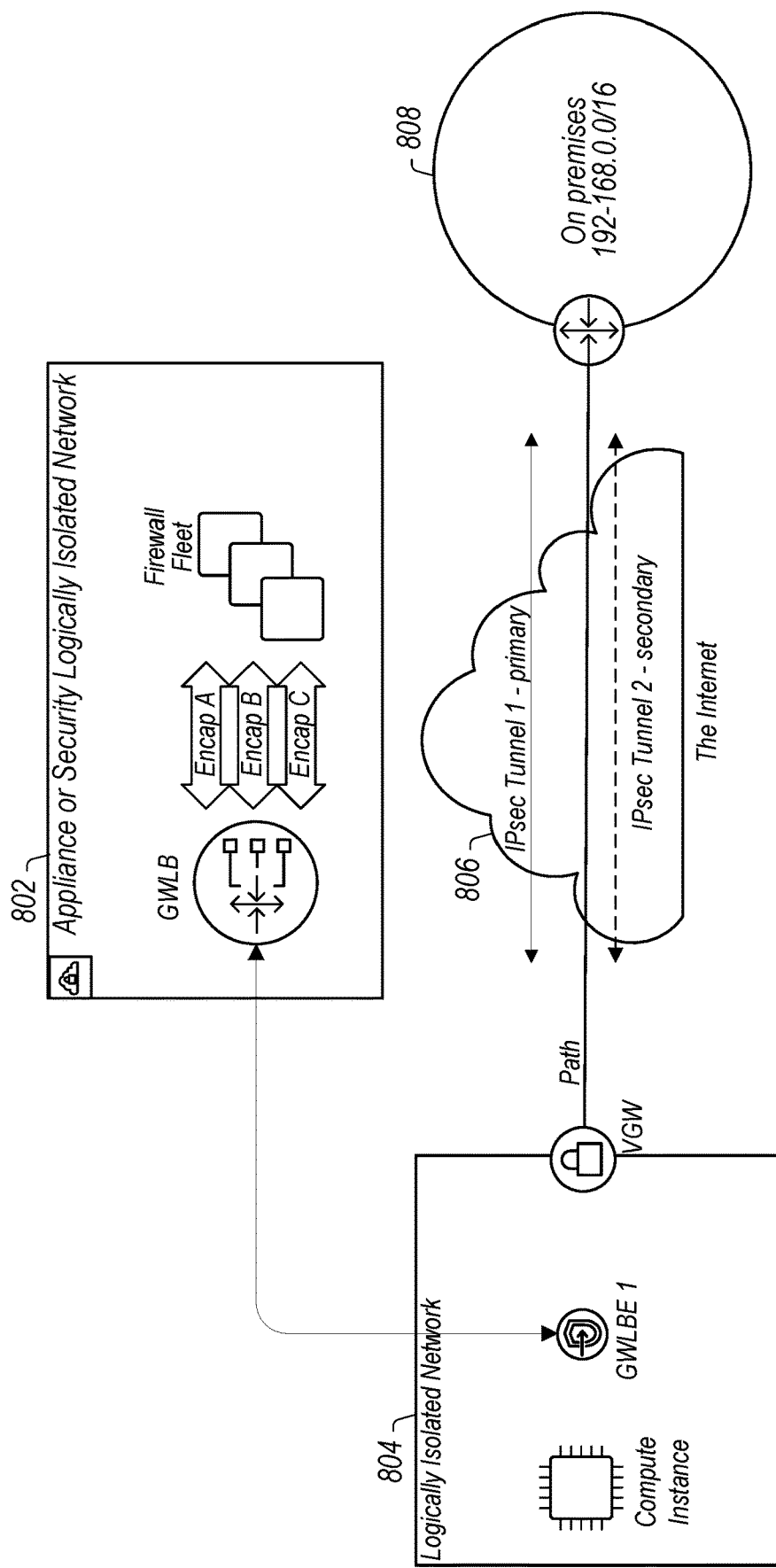
FIG. 8 is a logical block diagram illustrating of routing, by a virtual private gateway using a route of route table, ingress VPN traffic to a logically isolated network received over the public Internet, where the ingress VPN traffic is routed to a gateway load balancer, according to some embodiments.

FIG. 8 is a logical block diagram illustrating a routing, by a virtual private gateway ("VGW") using a route of route table, ingress VPN traffic to a logically isolated network received over the public Internet, where the ingress VPN traffic is routed to a gateway load balancer, according to some embodiments. FIG. 8 shows an on-premises workload 808 connecting to a logically isolated network 804 using a VPN tunnel 806, which terminates at the VGW. Most clients' security compliance policies require them to inspect all traffic coming into a logically isolated network. Therefore, the system of FIG. 8 sends traffic from the VGW to a gateway load balancer endpoint ("GWLBE") for transparent inspection before it reaches the destination. The GWLBE is associated with a GWLB in an appliance or security logically isolated network 802. The GWLB can send the packet to a firewall fleet in logically isolated network 802 for processing. The GWLB can encapsulate the packet to send it to the firewall fleet, where the packet is transmitting in three different paths "Encap A," "Encap B," or "Encap C"

depending on which firewall in the firewall fleet the packet is sent to (as can be determined by the load balancing algorithm in the GWLB), according to some embodiments.

Figure 9:
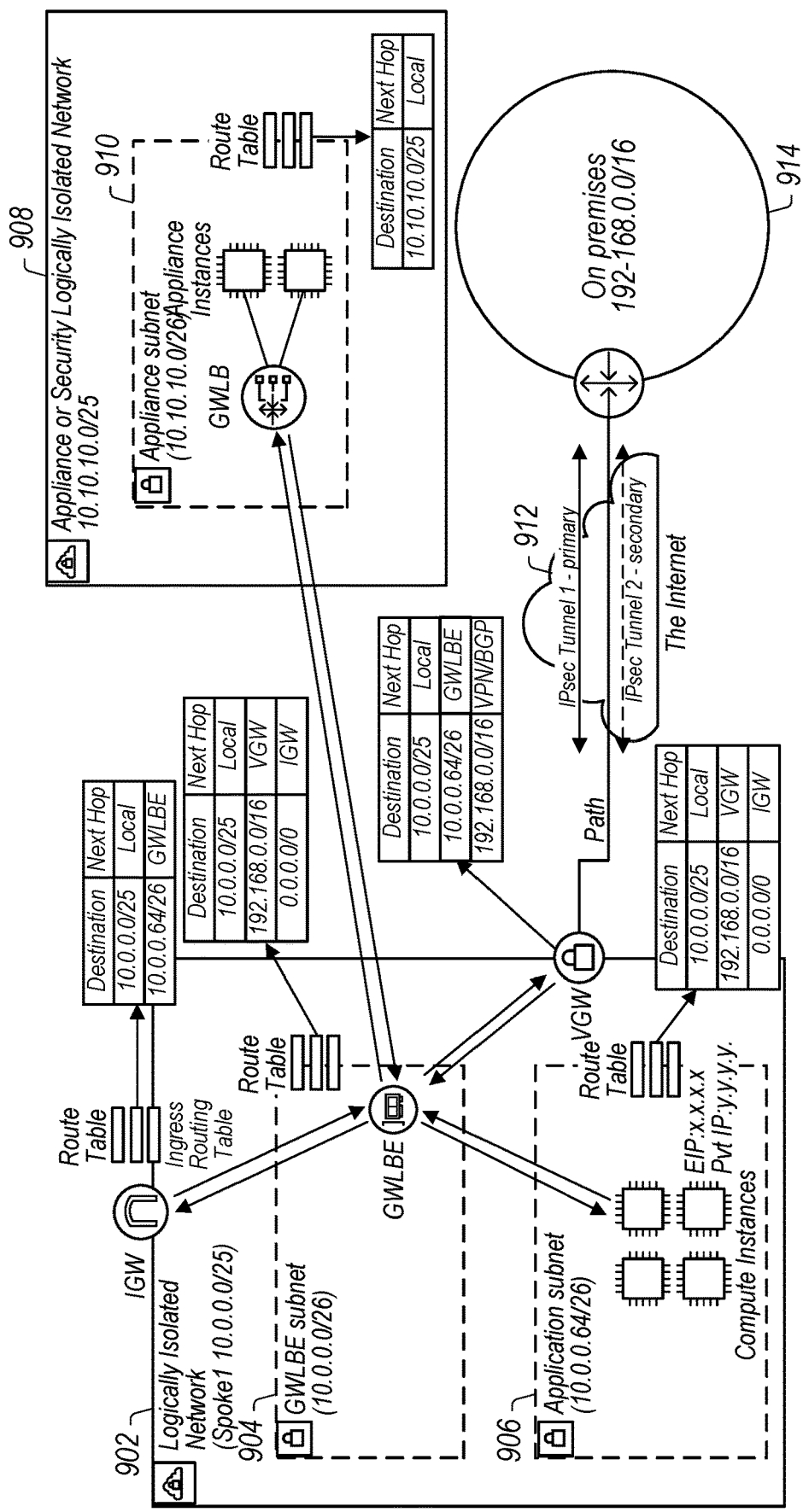
FIG. 9 is a logical block diagram illustrating additional details of routing, by a virtual private gateway using a route of route table, ingress VPN traffic to a logically isolated network received over the public Internet, where the ingress VPN traffic is routed to a gateway load balancer, according to some embodiments.

FIG. 9 is a logical block diagram illustrating additional details of routing, by a virtual private gateway ("VGW") using a route of route table, ingress VPN traffic 912 to a logically isolated network 902 received over the public Internet, where the ingress VPN traffic is routed to a gateway load balancer 904, according to some embodiments. The VGW Route Table associated with the VGW in FIG. 9 is resolved by longest prefix matching. First, all traffic destined for 192.168.x.x (where "x" can be anything) is routed back through the VPN to the on-premises workload 914. Then all traffic destined for 10.0.0.0/25 is destined for the local logically isolated network 902, except if there is a longer prefix that matches more specific traffic in the 10.0.0.0/25 address space. In fact there is a longer prefix that matches more specific traffic in the 10.0.0.0/25 address space. All traffic with a destination of the application subnet 906, with an address within the 10.0.0.64/26 address space, is routed to the GWLBE. The VGW Route Table associated with the VGW in FIG. 9 shows GWLBE as a next-hop (e.g. 10.0.0.64/26→GWLBE) for this traffic. This support for steering the VGW traffic to a GWLBE (or GWLB) simplifies inspection of the ingress VPN traffic.

The route table associated with the GWLBE in the GWLBE subnet 904 routes all traffic with a destination within the 10.0.0.0/25 address space locally within he logically isolated network 902. It routes all traffic within the 192.168.0.0/16 address space to the VGW. It then routes all remaining traffic to the Internet gateway in a catch-all route table entry: 0.0.0.0/0→IGW. The route table associated with the application subnet 906 operates similarly to the route table associated with the GWLBE. The IGW of the logically isolated network 902 routes all traffic that is destined for 10.0.0.0/25 to the local logically isolated network 902, except if there is a longer prefix that matches more specific traffic in the 10.0.0.0/25 address space. In fact there is a longer prefix that matches more specific traffic in the 10.0.0.0/25 address space. All traffic with a destination of the application subnet 906, with an address within the 10.0.0.64/26 address space, is routed to the GWLBE. The IGW Route Table associated with the IGW in FIG. 9 shows GWLBE as a next-hop (e.g. 10.0.0.64/26→GWLBE) for this traffic.

Figure 10:
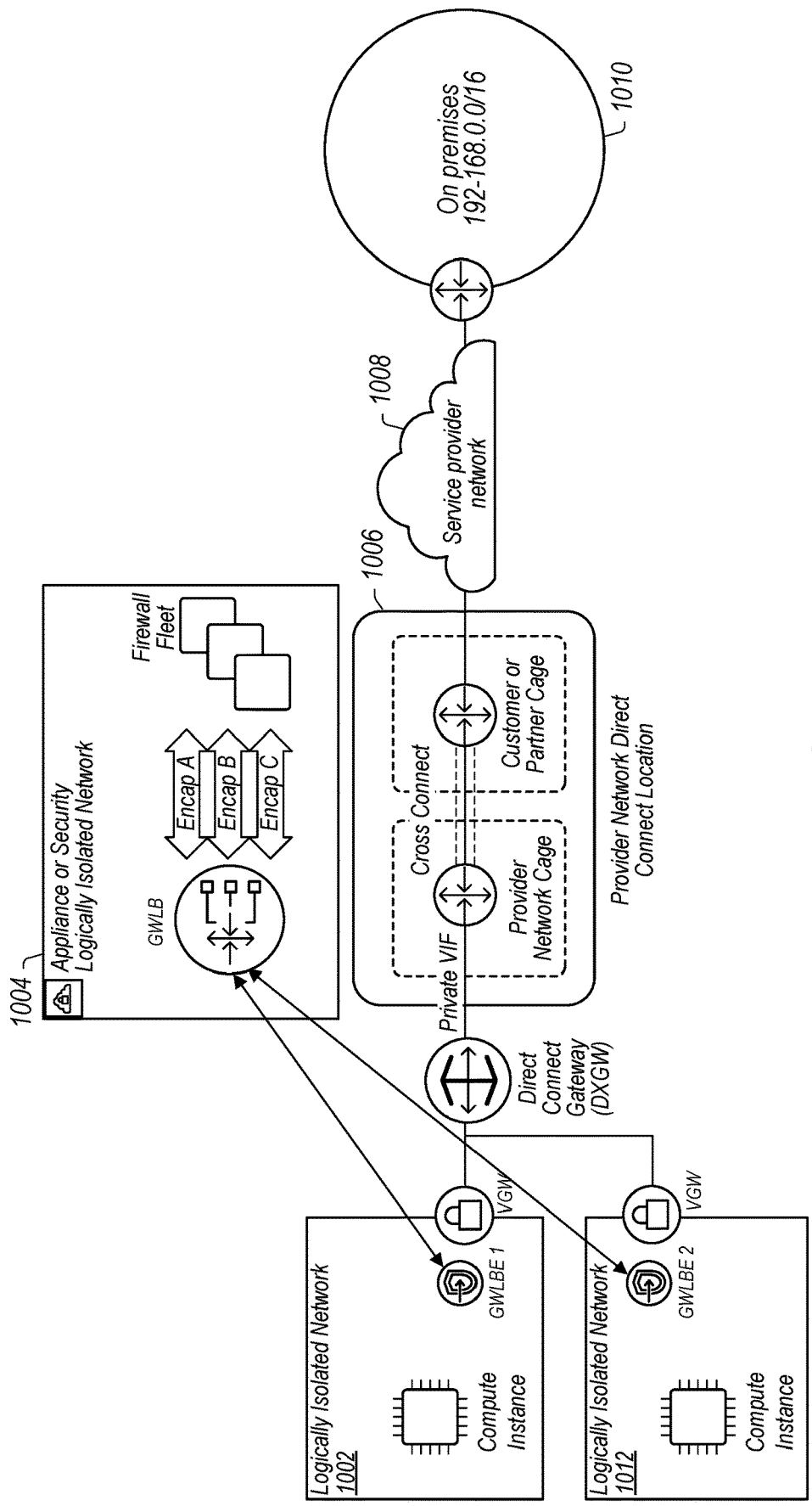
FIG. 10 is a logical block diagram illustrating of routing, by a virtual private gateway using a route of route table, ingress direct connect traffic to a logically isolated network received from a direct connect gateway over a direct connection, where the ingress VPN traffic is routed to a gateway load balancer of the logically isolated network, according to some embodiments.

FIG. 10 is a logical block diagram illustrating of routing, by a virtual private gateway ("VGW") using a route of route table, ingress direct connect traffic to logically isolated networks (1002, 1012) received from a direct connect gateway over a direct connection 1006, where the ingress VPN traffic is routed to a gateway load balancer of the logically isolated network (1002, 1012), according to some embodiments. FIG. 10 is similar to FIG. 8 above. The only difference is that a VPN tunnel from an on-premises data center 1010 is established on top of Direct Connect 1006, instead of using the public Internet. As with FIG. 8, most clients' security compliance policies require them to inspect all traffic coming into a logically isolated network. Therefore, the system of FIG. 10 sends traffic from the respective VGWs to a respective gateway load balancer endpoint ("GWLBE") for transparent inspection before it reaches the destination. The GWLBE sis associated with the same GWLB in an appliance or security logically isolated network 1004. The GWLB can send the packet to a firewall fleet in logically isolated network 1004 for processing. The GWLB can encapsulate the packet to send it to the firewall fleet, where the packet is transmitting in three different paths "Encap A," "Encap B," or "Encap C" depending on which firewall in the firewall fleet the packet is sent to (as can be determined by the load balancing algorithm in the GWLB), according to some embodiments.

Figure 11:
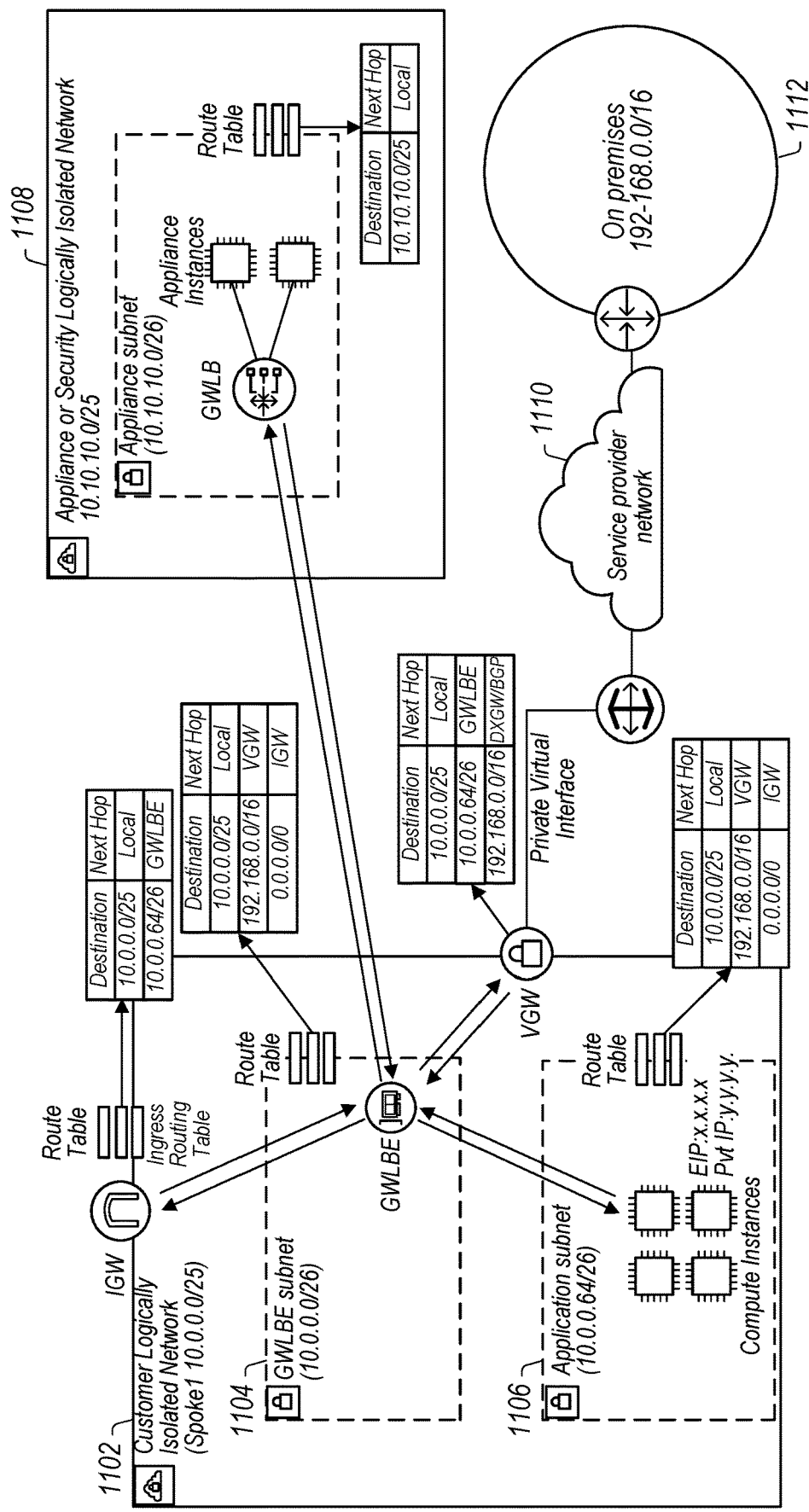
FIG. 11 is a logical block diagram illustrating additional details of routing, by a virtual private gateway using a route of route table, ingress direct connect traffic to a logically isolated network received from a direct connect gateway over a direct connection, where the ingress VPN traffic is routed to a gateway load balancer of the logically isolated network, according to some embodiments.

FIG. 11 is a logical block diagram illustrating additional details of routing, by a virtual private gateway ("VGW") using a route of route table, ingress direct connect traffic to a logically isolated network 1102 received from a direct connect gateway over a direct connection, where the ingress VPN traffic is routed to a GWLBE of a GWLBE subnet 1104 of the logically isolated network 1102, according to some embodiments. FIG. 11 is similar to FIG. 9, with the VPN tunnel established over Direct Connect (DX) as the only difference The VGW Route Table associated with the VGW in FIG. 11 is resolved by longest prefix matching. First, all traffic destined for 192.168.x.x (where "x" can be anything) is routed back through the direct connect gateway, to the direct connection, and then to the on-premises workload 1112. Then all traffic destined for 10.0.0.0/25 is destined for the local logically isolated network 1102, except if there is a longer prefix that matches more specific traffic in the 10.0.0.0/25 address space. In fact there is a longer prefix that matches more specific traffic in the 10.0.0.0/25 address space. All traffic with a destination of the application subnet 1106, with an address within the 10.0.0.64/26 address space, is routed to the GWLBE. The VGW Route Table associated with the VGW in FIG. 9 shows GWLBE as a next-hop (e.g. 10.0.0.64/26→GWLBE) for this traffic. This support for steering the VGW traffic to a GWLBE (or GWLB) simplifies inspection of the ingress VPN traffic.

The route table associated with the GWLBE in the GWLBE subnet 1104 routes all traffic with a destination within the 10.0.0.0/25 address space locally within he logically isolated network 902. It routes all traffic within the 192.168.0.0/16 address space to the VGW. It then routes all remaining traffic to the Internet gateway in a catch-all route table entry: 0.0.0.0/0→IGW. The route table associated with the application subnet 1106 operates similarly to the route table associated with the GWLBE. The IGW of the logically isolated network 1102 routes all traffic that is destined for 10.0.0.0/25 to the local logically isolated network 1102, except if there is a longer prefix that matches more specific traffic in the 10.0.0.0/25 address space. In fact there is a longer prefix that matches more specific traffic in the 10.0.0.0/25 address space. All traffic with a destination of the application subnet 1106, with an address within the 10.0.0.64/26 address space, is routed to the GWLBE. The IGW Route Table associated with the IGW in FIG. 11 shows GWLBE as a next-hop (e.g. 10.0.0.64/26→GWLBE) for this traffic.

The examples of associating route tables with ingress traffic to logically isolated networks of a provider network discussed above with regard to FIGS. 2-11 have been given in regard to a provider network. Various other types or configurations of a system or service that hosts resources in logically isolated networks may implement these techniques. Thus, the components such as those discussed above with regard to FIGS. 2-11 may be differently implemented and still perform associating route tables with ingress traffic to logically isolated networks, and routing ingress traffic for logically isolated networks that is destined for public and/or private IP blocks, where the ingress traffic is routed without performing a network address translation, such as from public to private IP addresses.

Figure 12:
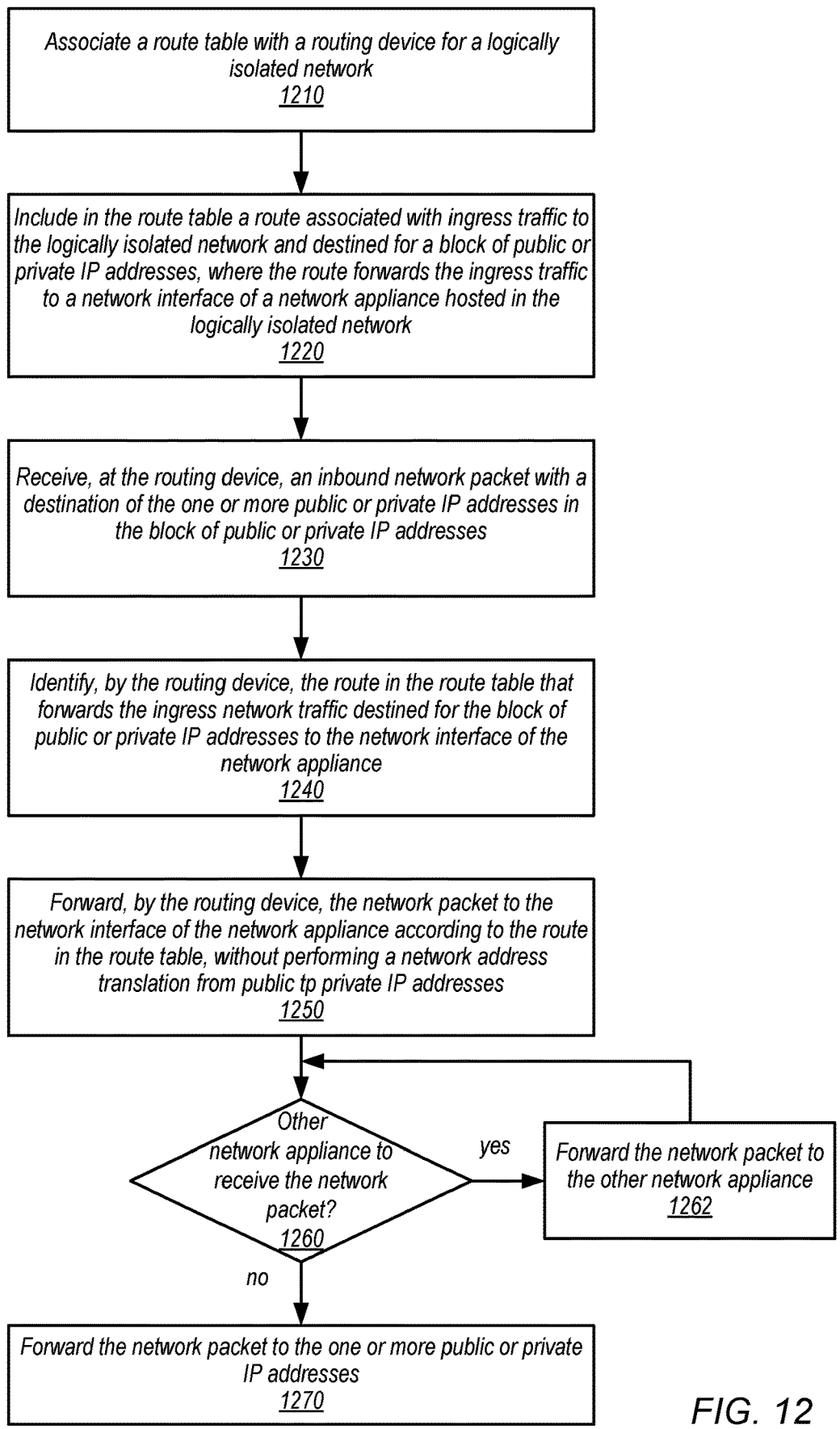
FIG. 12 is a high-level flow chart that illustrates various methods and techniques routing ingress traffic for logically isolated networks using a route in a route table, where the ingress traffic is destined for a block of public or private IP addresses, without performing a network address translation, according to various embodiments.

FIG. 12 is a high-level flow chart that illustrates various methods and techniques for associating route tables with ingress traffic to logically isolated networks, according to various embodiments. These techniques may be implemented using various components of a provider network as described above with regard to FIGS. 2-11 or other provider network components.

A logically isolated network within a provider network may be created for a client account (e.g., a first client account) of a provider network or other system that offers logical network isolation to users, in some embodiments. A network configuration for the logically isolated network may be established during creation (e.g., access control lists, route tables, DHCP options, DNS settings, network peering connections, public or private network gateways, network endpoints, network auditing or monitoring) and may be later modified.

As indicated at 1210, a route table may be associated with a routing device for a logically isolated network, in various embodiments. For example, a router or other networking device that forwards traffic into and out of a logically isolated network can receive traffic from (or implement) an external traffic gateway as discussed above with regard to FIG. 3. A request that identifies the routing device (or the external traffic gateway) can be received and the association of the route table be performed in response to the request, in some embodiments. Prior to the association of the route table, a default route or other mapping may be performed at the routing device that was automatically generated for the logically isolated network when it was created (but may have not been explicitly identified or associated with the edge of the logically isolated network by a user in a request).

As indicated at 1220, a route may be included in the route table associated with ingress traffic to the logically isolated network and destined for a block of public and/or private IP addresses, where the route forwards the ingress traffic to a network interface of a network appliance hosted in the logically isolated network, in some embodiments. For example, the route may specify a CIDR for network traffic bound to the pool of public and/or private IP addresses as a destination, and include as a target for the ingress traffic, an identifier for a network interface of the network appliance, as illustrated above in FIGS. 3 and 5-11.

As indicated at 1230, a network packet may be received at the edge device with a destination of the one or more public and/or private IP addresses in the block of public and/or private IP addresses, in some embodiments. For example, a network packet may include a network address (e.g., an Internet Protocol (IP) address) of user equipment ("UEIP") such as a smartphone.

As indicated at 1240, the route in the route table may be identified by the routing device to override the destination in the network packet with the network appliance. For example, a longest prefix match may indicate the next hop address at the routing device is the override route. The override route can instruct the forwarding of the ingress network traffic destined for the block of public and/or private IP addresses to the network interface of the network appliance. In other embodiments, a hash table, or other mapping information may be used to perform a look-up at the routing device (and destination resolution if no applicable route is found may be performed by a separate network manager or dropped by the routing device). The mapping information may be updated, as discussed above with regard to FIG. 4 and below with regard to FIG. 12 by a network manager instead of implementing a matching technique at the routing device, in some embodiments.

As indicated at 1250, the routing device may forward the network packet to the network interface of the network appliance according to the route in the route table, without performing a network address translation, such as from public to private IP addresses, in some embodiments. Unlike packets whose destination is the logically isolated network, the network packet destined for the public and/or private IP address pool will not be encapsulated with a substrate network address that identifies the network appliance even though the destination of the network packet still specifies the computing resource. Instead, the network packet destined for the public and/or private IP address pool will be forwarded to the network interface of the network appliance unchanged, in some embodiments.

As indicated at 1260, other network appliances may also receive the network packet from the first network appliance (e.g., as part of a network appliance chain), in some embodiments. In some embodiments, the chain of network appliances may be selected and deployed in a provider network for a logically isolated network (e.g., from a third-party market place for network appliances offered in the provider network or as part of different listings of network appliance chains developed specifically for and offered on the provider network). If the route table for the network appliance directs local traffic to another network identifier for a network interface for another network appliance, then the network packet may be forwarded to the other network appliance, as indicated at 1262, in some embodiments. Multiple network appliances may receive the network packet, form various packet processing features and then forward on the network packet (or drop the network packet in some scenarios, such as when directed to by a firewall or other security feature implemented by a network appliance). As indicated at 1270, if no other network appliance is to receive the network packet, then the network packet may be forwarded to the one or more public and/or private IP addresses by the latest network appliance to receive the network packet, in some embodiments.

Figure 13:
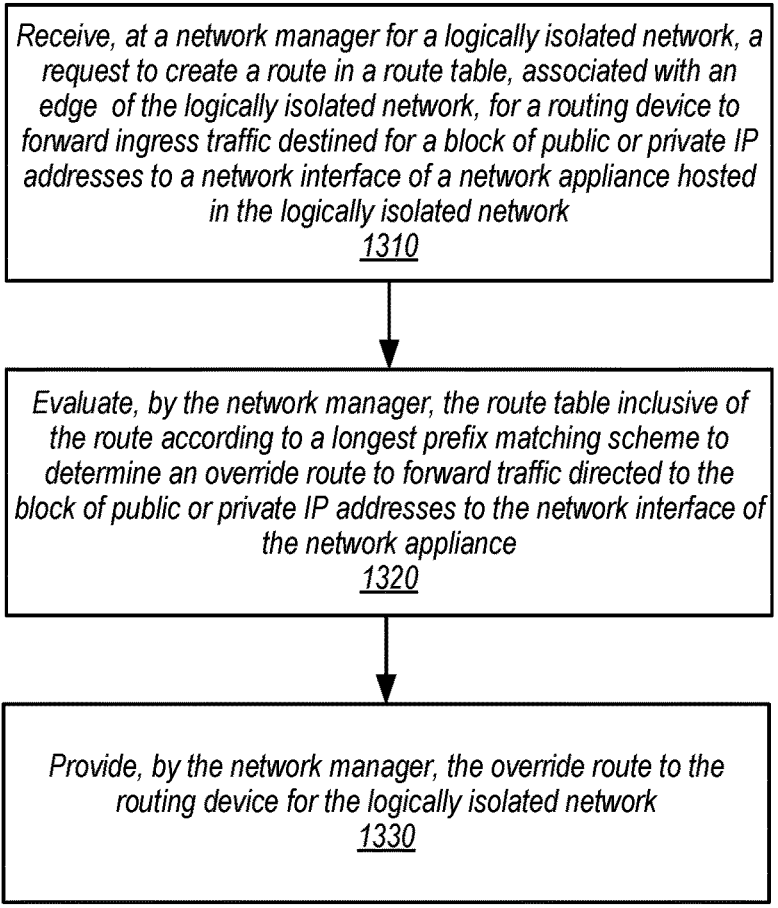
FIG. 13 is a high-level flow chart that illustrates various methods and techniques for determining an override route for an edge routing device to forward traffic directed to a block of public or private IP addresses, according to various embodiments.

FIG. 13 is a high-level flow chart that illustrates various methods and techniques for determining an override route for an edge routing device, according to various embodiments. As indicated at 1310, a request to create a route in a route table associated with an edge of the logically isolated network, for a routing device to forward ingress traffic destined for a block of public and/or private IP addresses to a network interface of a network appliance hosted in the logically isolated network may be received at a network manager for the logically isolated network, in some embodiments (e.g., such as request 414 discussed above in FIG. 4)

As indicated at 1320, the route table may be evaluated by the network manager inclusive of the route according to a longest prefix matching scheme to determine an override route to forward the traffic directed to the block of public and/or private IP addresses to the network appliance. For example, the route addition may be evaluated with respect to other routes in the routing table to determine which associated resources may change in their routing due to the length of the route as specified in the request. A route with a longer prefix may cause the mappings of some interfaces, resources, or other objects in the logically isolate network to be shifted or changed if they are a better match to the new route.

As indicated at 1330, the override route may be provided to a routing device (or multiple routing devices if multiple routing devices are responsible for the logically isolated network), in some embodiments. The override route may (or may not) be represented in the same format as received in the request. For example, the override route may be specified as a hash table or other mapping scheme entry (or multiple entries), in some embodiments, and may provide a substrate network address to use in encapsulating network packets at the routing devices to be forwarded to the network appliance instead of computing resources hosted within the logically isolated network.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 14:
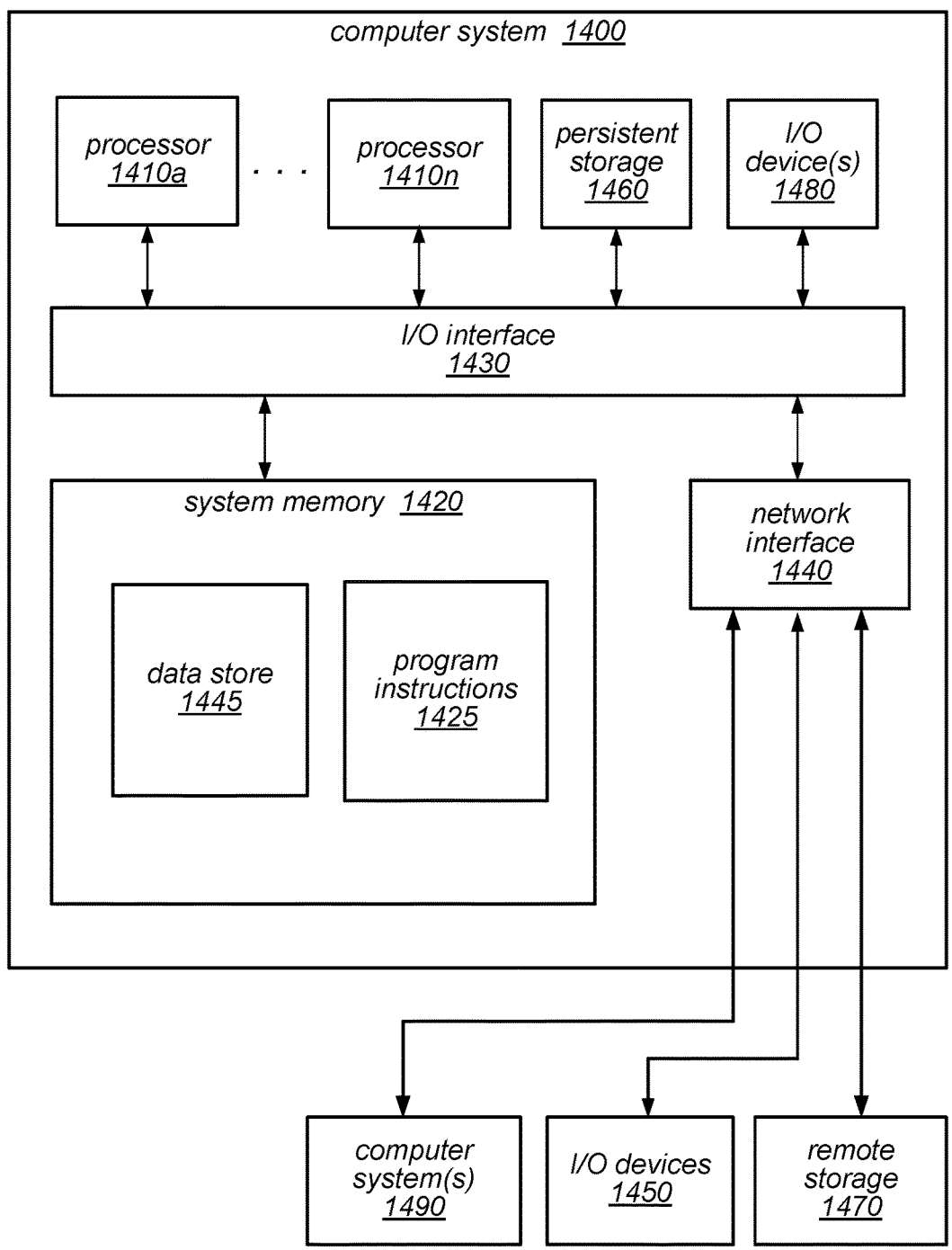
FIG. 14 is a block diagram illustrating an example computing system, according to some embodiments.

Embodiments of routing ingress traffic for logically isolated networks that is destined for public and/or private IP blocks, where the ingress traffic is routed without performing a network address translation, such as from public to private IP addresses as described herein may be executed on one or more computer systems, which may interact with various other devices. FIG. 14 is a block diagram illustrating an example computer system, according to various embodiments. For example, computer system 1400 may be configured to implement nodes of a provider network, such as may implement various resources, a control plane, or diagnostic agents, and/or a client, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, compute node, or computing node.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.). For example, a client application executing on system 1400 may use network interface 1440 to communicate with a server application executing on a single server or on a cluster of servers that implement one or more of the components of the system described herein. In another example, an instance of a server application executing on computer system 1400 may use network interface 1440 to communicate with other instances of the server application (or another server application) that may be implemented on other computer systems (e.g., computer systems 1490).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments. computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a provider network, in different embodiments. In some embodiments, program instructions 1425 may implement multiple separate clients, nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. In general, system memory 1420 (e.g., data store 1445 within system memory 1420), persistent storage 1460, and/or remote storage 1470 may store data blocks, replicas of data blocks, metadata associated with data blocks and/or their state, configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490 (which may implement one or more nodes, endpoints, systems, or services internal to or external to a provider network, and/or clients of the provider network described herein), for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of compute nodes of a computing service, respectively comprising at least one processor and a memory to implement an edge routing device for a logically isolated network, a network manager for the logically isolated network, and a network interface for a network appliance hosted in the logically isolated network;
wherein the network manager is configured to:
receive, via an interface for the network manager, one or more requests that associate a route for a route table with ingress network traffic for the logically isolated network, wherein the ingress network traffic is destined for a block of public or private IP addresses, and wherein the route forwards the ingress network traffic to the network interface of the network appliance;

provide the route to the edge routing device;
wherein the edge routing device for the logically isolated network is configured to:
receive the route for the route table;
receive an inbound network packet for the logically isolated network with a destination of one or more public or private IP addresses in the block of public or private IP addresses;
identify the route in the route table that forwards the ingress network traffic destined for the block of public or private IP addresses to the network interface for the network appliance; and
forward the network packet from the edge routing device to the network interface for the network appliance according to the route identified in the route table, without performing a network address translation; and
wherein the network appliance is configured to forward the packet to the public or private IP address.

2. The system of claim 1, wherein the edge routing device comprises a first and second fleet of compute instances, wherein the first fleet of compute instances is further configured to:
receive the inbound network packet for the logically isolated network with the destination of the one or more public or private IP addresses in the block of public or private IP addresses;
determine that using the destination address of the inbound network packet to identify the route in the route table cannot be performed with constant time processing; and
forward the inbound network packet to the second fleet of compute instances, wherein the second fleet of compute instances is configured to perform non-constant time processing to identify the route in the route table that forwards the ingress network traffic destined for the block of public or private IP addresses.

3. The system of claim 1, wherein to identify the route in the route table that forwards the ingress network traffic destined for the block of public or private IP addresses to the network interface, the edge routing device is further configured to:
evaluate the route table inclusive of the route according to a longest prefix matching scheme to determine an override route to forward the inbound network packet with the destination of the one or more public or private IP addresses in the block of public or private IP addresses, wherein the override route is the route provided to the edge routing device by the network manager.

4. The system of claim 1, wherein the plurality of compute nodes are implemented as part of a provider network, wherein the computing service is part of the provider network, and wherein the network appliance is one of a plurality of different network appliances selectable via an interface to the provider network by a user associated with the logically isolated network to be implemented for the user at the provider network.

5. A method, comprising:
receiving, at a routing device for a logically isolated network, an inbound network packet with a destination of one or more IP addresses in a block of IP addresses;
identifying, by the routing device, a route in a route table associated with ingress traffic to the logically isolated network, that forwards the ingress network traffic destined for the block of IP addresses from the edge routing device to a network interface of a network appliance hosted in the logically isolated network; and
forwarding, by the routing device, the inbound network packet to the network interface of the network appliance according to the route identified in the route table without performing a network address translation, wherein the network packet is forwarded to the one or more IP addresses by the network appliance or another network appliance hosted in the logically isolated network.

6. The method of claim 5, further comprising:
receiving, via an interface at a network manager for the logically isolated network, one or more requests that associate the route table with the routing device, and to include in the route table the route associated with the ingress network traffic destined for the block of IP addresses;
associating the route table with the routing device; and
providing, by the network manager, the route to the routing device.

7. The method of claim 6, wherein the one or more requests that associate the route table with the routing device comprise a request to associate the route table with a public Internet gateway of the logically isolated network.

8. The method of claim 6, wherein the one or more requests that associate the route table with the routing device comprise a request to associate the route table with a virtual private gateway of the logically isolated network.

9. The method of claim 5, wherein the routing device comprises a first and second fleet of compute instances, the method further comprising:
receiving, at the first fleet of compute instances of the routing device, the inbound network packet with the destination of the one or more IP addresses in the block of IP addresses;
determining, at the first fleet of compute instances, that using the destination of the inbound network packet to identify the route in the route table cannot be performed with constant time processing; and
forwarding, by at the first fleet of compute instances, the inbound network packet to the second fleet of compute instances to perform non-constant time processing to identify the route in the route table that forwards the ingress network traffic destined for the block of IP addresses.

10. The method of claim 6, further comprising:
receiving a request, via the interface at the network manager, to include the route in the route table, wherein the request includes an identifier for the network interface of the network appliance, to point the route to the network interface of the network appliance.

11. The method of claim 5, further comprising forwarding, by the network appliance, the network packet to a second network appliance hosted in the logically isolated network, wherein the network packet is forwarded to the one or more IP addresses by the second network appliance or the network appliance hosted in the logically isolated network.

12. The method of claim 5, further comprising:
receiving, at the routing device for the logically isolated network, a second inbound network packet with the destination of one or more same or different IP addresses in a block of IP addresses;
identifying, by the routing device, the route in the route table associated with ingress traffic to the logically isolated network, that forwards the ingress network traffic destined for the block of IP addresses from the edge routing device to a network interface of a network appliance hosted in the logically isolated network;

forwarding, by the routing device, the second inbound network packet to the network interface of the network appliance according to the route identified in the route table without performing a network address translation; and dropping the second network packet at the network appliance as part of processing the second network packet.

13. The method of claim 5, further comprising:

receiving, via an interface at a network manager for the logically isolated network, one or more requests that remove an association between the route table and the routing device;

removing the association between the route table and the routing device; and providing, by the network manager, an update to the routing device to remove the route.

14. One or more non-transitory, computer-readable storage media, storing program instructions that when executed on or across one or more computing devices of a routing device for a logically isolated network, cause the one or more computing devices to implement:

receive, at the routing device for the logically isolated network, a route for a route table associated with ingress traffic to the logically isolated network, wherein the ingress network traffic is destined for a block of IP addresses, and wherein the route forwards the ingress network traffic to a network interface of a network appliance hosted in the logically isolated network;

receive an inbound network packet for the logically isolated network with a destination of one or more IP addresses in the block of IP addresses;

identify the route in a route table that forwards the ingress network traffic destined for the block of IP addresses to the network interface of the network appliance hosted in the logically isolated network; and forward the inbound network packet to the network interface of the network appliance according to the route identified in the route table without performing a network address translation, wherein the network packet is forwarded to the one or more IP addresses by the network appliance or another network appliance hosted in the logically isolated network.

15. The one or more non-transitory, computer-readable storage media of claim 14, wherein the route for the route table is received from a network manager for the logically isolated network and wherein the network manager provided the route for the route table responsive to receiving one or more requests via an interface for the network manager that associate the route table with the routing device and that include in the route table the route associated with ingress network traffic.

16. The one or more non-transitory, computer-readable storage media of claim 15, wherein the one or more requests that associate the route table with the routing device comprise a request to associate the route table with an Internet gateway of the logically isolated network.

17. The one or more non-transitory, computer-readable storage media of claim 15, wherein the one or more requests that associate the route table with the routing device comprise a request to associate the route table with a private network gateway of the logically isolated network.

18. The one or more non-transitory, computer-readable storage media of claim 15, wherein the one or more requests that associate the route table with the routing device comprise a request to associate the route table with a virtual traffic hub connected to the logically isolated network and one or more additional logically isolated networks, wherein the network packet is received from a second resource hosted in one of the one or more additional logically isolated networks.

19. The one or more non-transitory, computer-readable storage media of claim 14, wherein the logically isolated network is implemented as part of a provider network, wherein the network appliance is hosted within the provider network, and wherein the program instructions further cause the one or more computing devices of the routing device for the logically isolated network to further implement:

receive a second network packet with a destination of one or more different IP addresses in a different block of IP addresses;

identify a second route in the route table that forwards the ingress network traffic destined for the different block of IP addresses to the network interface of the network appliance hosted in the logically isolated network; and forward, by the routing device, the second network packet to the network interface of the network appliance according to the second route identified in the route table without performing a network address translation, wherein the network packet is forwarded to the one or more different IP addresses by the network appliance or another network appliance hosted in the logically isolated network.

20. The one or more non-transitory, computer-readable storage media of claim 14, wherein to identify the route in the route table that forwards the ingress network traffic destined for the block of IP addresses to the network interface of the network appliance, the program instructions further cause the one or more computing devices of the routing device for the logically isolated network to further implement:

evaluate the route table inclusive of the route according to a longest prefix matching scheme to determine an override route to forward the inbound network packet with the destination of the one or more IP addresses in the block of IP addresses, wherein the override route is the route received at the routing device.

* * * * *